United States Patent
Okazaki

(10) Patent No.: US 12,314,724 B2
(45) Date of Patent: May 27, 2025

(54) ARITHMETIC PROCESSING DEVICE AND ARITHMETIC PROCESSING METHOD

(71) Applicant: Fujitsu Limited, Kawasaki (JP)

(72) Inventor: Ryohei Okazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 174 days.

(21) Appl. No.: 18/216,186

(22) Filed: Jun. 29, 2023

(65) Prior Publication Data
US 2024/0118900 A1    Apr. 11, 2024

(30) Foreign Application Priority Data
Oct. 6, 2022   (JP) ................................ 2022-161603

(51) Int. Cl.
*G06F 9/30*   (2018.01)
*G06F 9/38*   (2018.01)

(52) U.S. Cl.
CPC .......... *G06F 9/3861* (2013.01); *G06F 9/3844* (2013.01); *G06F 9/3848* (2013.01); *G06F 9/3867* (2013.01)

(58) Field of Classification Search
CPC .... G06F 9/3861; G06F 9/3844; G06F 9/3848; G06F 9/3867
See application file for complete search history.

(56) References Cited

U.S. PATENT DOCUMENTS

| | | | |
|---|---|---|---|
| 6,938,151 B2 * | 8/2005 | Bonanno | G06F 9/3848 712/239 |
| 9,594,564 B2 * | 3/2017 | Kuwahara | G06F 9/3848 |
| 10,579,414 B2 * | 3/2020 | Soundararajan | G06F 9/46 |
| 2009/0172360 A1 | 7/2009 | Hikichi | |
| 2015/0052338 A1 * | 2/2015 | Kuwahara | G06F 9/3806 712/240 |
| 2019/0354368 A1 | 11/2019 | Okazaki | |

FOREIGN PATENT DOCUMENTS

| | | |
|---|---|---|
| JP | 2015-036888 A | 2/2015 |
| JP | 2019-200523 A | 11/2019 |
| WO | 2008/029450 A1 | 3/2008 |

* cited by examiner

*Primary Examiner* — Corey S Faherty
(74) *Attorney, Agent, or Firm* — WHDA, LLP

(57) ABSTRACT

An arithmetic processing device executes instructions by pipeline processing. In the arithmetic processing device, a branch predictor includes a prediction holder holding a prediction value of a consecutively taken branch count, a current taken branch count, and a prediction value of a remaining taken branch count for conditional branch instructions. A branch instruction issuance scheduler outputs an instruction refetch request upon a branch prediction miss of a conditional branch instruction held at an entry other than a head of a branch instruction completion queue holding branch instructions to be completed, and a repair request to the branch predictor for conditional branch instructions held between the entry and the head of the queue. In response to the requests, the branch predictor updates the prediction value of the remaining taken branch count for the conditional branch instructions corresponding to the repair request.

9 Claims, 11 Drawing Sheets

ARITHMETIC PROCESSING DEVICE AND ARITHMETIC PROCESSING METHOD

CROSS-REFERENCE TO RELATED APPLICATIONS

The present application is based upon and claims the benefit of priority of Japanese Patent Application No. 2022-161603 filed on Oct. 6, 2022, the entire contents of which are hereby incorporated by reference.

FIELD

The present disclosure relates to an arithmetic processing device and an arithmetic processing method.

BACKGROUND

An arithmetic processing device such as a CPU has a pipeline that divides and executes instructions to be capable of executing the instructions in parallel, and thereby, improves the processing performance. Further, in the case where this type of arithmetic processing device is provided with a branch prediction mechanism to predict whether a branch of a conditional branch instruction is taken or not taken, the processing performance is further improved.

For example, a branch prediction method has been known in which, for each conditional branch instruction having the same address, the number of times the branch is taken consecutively and the number of times the branch is not taken consecutively are stored as a pattern, to predict whether the conditional branch instruction is taken or not taken (see Patent Documents 1 and 2).

RELATED ART DOCUMENTS

Patent Documents

[Patent Document 1] Japanese Laid-Open Patent Application No. 2015-036888
[Patent Document 2] WO2008/029450

For example, a reservation station for branch instructions executes processing of branch instructions in order, and sequentially issues completion reports of the branch instructions starting from the head of a queue holding information on the branch instructions. For example, in the case where it is determined that a branch prediction miss occurs based on an execution result of a conditional branch instruction, the reservation station for the branch instructions waits until the determined conditional branch instruction reaches the head of the queue, and then, outputs an instruction refetch request corresponding to the branch prediction miss.

In this way, in the case where the instruction refetch request is output in order, fetch processing for the instruction refetch request cannot be executed until the conditional branch instruction for which the branch prediction miss is determined reaches the head of the queue. In this case, the processing time of the instruction fetch pipeline executing the fetch processing for the instruction refetch request cannot be hidden, and the processing performance of the arithmetic processing device is reduced.

In the case where the instruction refetch request can be output out of order without waiting until the conditional branch instruction for which the misprediction is determined reaches the head of the queue, the processing time of the instruction fetch pipeline for executing the fetch processing for the instruction refetch request can be hidden. However, no method has been proposed that outputs an instruction refetch request out of order without lowering the prediction accuracy of conditional branch instructions.

SUMMARY

According to one aspect, an arithmetic processing device that executes instructions by pipeline processing includes: a branch predictor including a prediction holder configured to hold prediction information including a prediction value of a consecutively taken branch count for each conditional branch instruction, a current taken branch count for said each conditional branch instruction, and a prediction value of a remaining taken branch count for said each conditional branch instruction, and configured to predict the consecutively taken branch count for said each conditional branch instruction based on the prediction values; an address generator configured to generate a fetch address of a next instruction, based on a prediction result by the branch predictor or an address included in an instruction refetch request; and a branch instruction issuance scheduler including a branch instruction completion queue sequentially holding branch instructions each fetched based on the fetch address, and configured to complete the branch instructions held in the branch instruction completion queue in order, output the instruction refetch request in a case where a branch prediction miss is determined by the branch predictor based on an execution result of a conditional branch instruction, and in a case where a branch prediction miss is determined for a conditional branch instruction held at an entry other than a head of the branch instruction completion queue, output a repair request to the branch predictor corresponding to conditional branch instructions held between the entry where the branch prediction miss is determined and the head of the branch instruction completion queue, wherein the branch predictor sets the prediction value of the remaining taken branch count to a difference between the prediction value of the consecutively taken branch count and the current taken branch count, based on the instruction refetch request from the entry other than the head of the branch instruction completion queue, and further subtracts a number of conditional branch instructions corresponding to the repair request from the prediction value of the remaining taken branch count.

The object and advantages in the embodiment will be realized and attained by means of the elements and combinations particularly pointed out in the claims. It is to be understood that both the foregoing general description and the following detailed description are exemplary and explanatory and are not restrictive of the invention as claimed.

DESCRIPTION OF EMBODIMENTS

Figure 1:
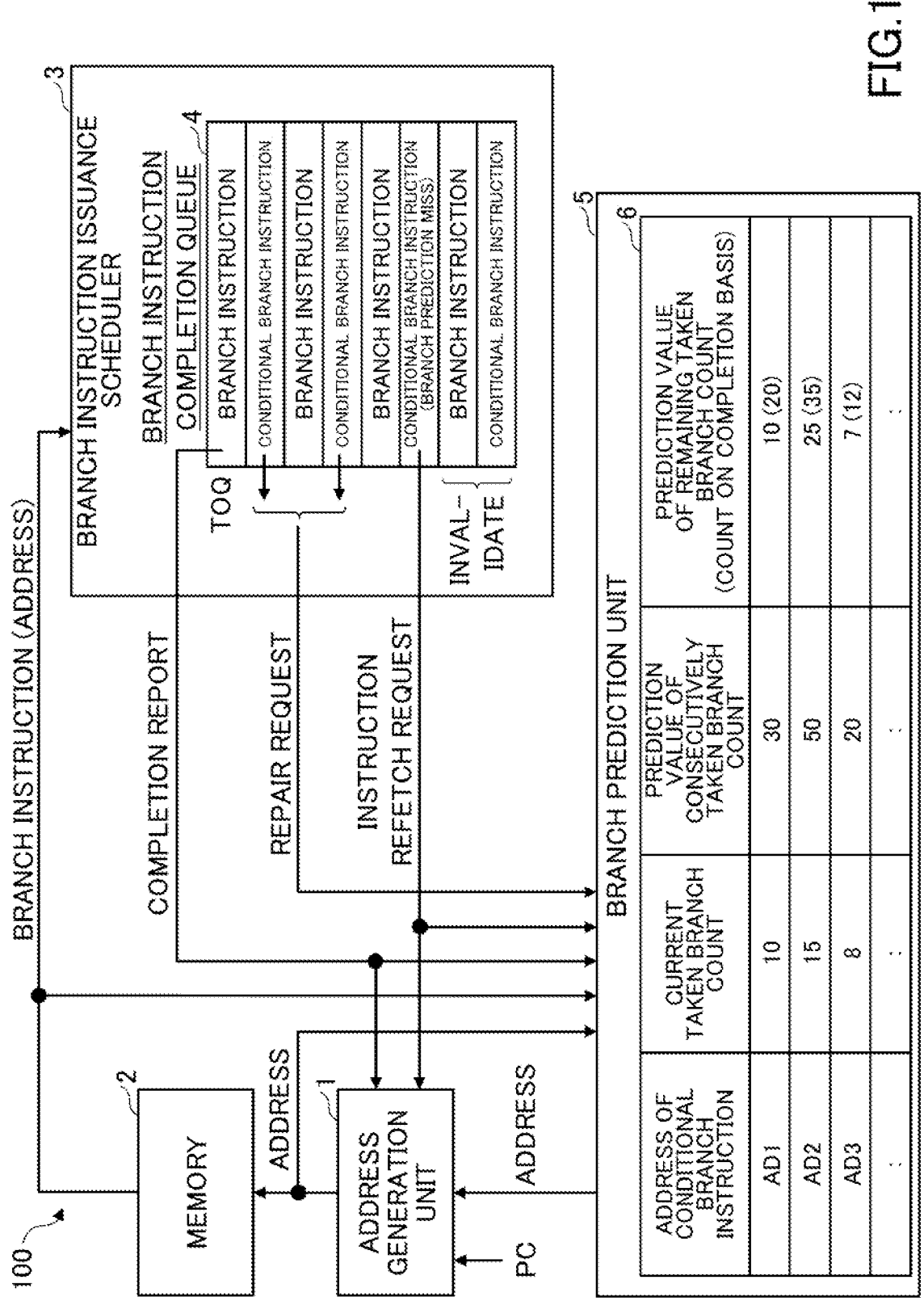
FIG. 1 is a block diagram illustrating an example of an arithmetic processing device in one embodiment.

In the following, embodiments will be described with reference to the drawings. According to an embodiment, an instruction refetch request can be output out of order without lowering the prediction accuracy of conditional branch instructions. In the following, for a signal line through which a signal is transmitted, the same reference numeral as the signal name is used. Although not limited in particular, the arithmetic processing device described below is a superscalar processor, and executes instructions in parallel by pipeline processing. Note that the arithmetic processing device described below may be a scalar processor.

FIG. 1 illustrates an example of an arithmetic processing device in one embodiment. The arithmetic processing device 100 illustrated in FIG. 1 includes an address generation unit 1, a memory 2, a branch instruction issuance scheduler 3, and a branch prediction unit 5.

The arithmetic processing device 100 may include an instruction buffer unit that holds instructions, an instruction decoder unit that decodes an instruction, an arithmetic instruction issuance scheduler that schedules output of arithmetic instructions, an arithmetic unit to execute arithmetic instructions, a register file that holds operand data, and the like.

The address generation unit 1 outputs the value of a program counter PC or an address output from the branch prediction unit 5 to the memory 2, and fetches an instruction from the memory 2. The instruction fetched from the memory 2 is supplied to the branch instruction issuance scheduler 3, the branch prediction unit 5, the arithmetic instruction issuance scheduler (not illustrated), and the like. For example, the address generation unit 1 detects a branch prediction miss based on an instruction refetch request (including a refetch instruction address) notified from the branch instruction issuance scheduler 3. In this case, the address generation unit 1 fetches an instruction using the refetch instruction address. In the case of clearing the pipeline to cancel execution of instructions due to occurrences of various types of errors, the address generation unit 1 fetches an instruction by using the value of the program counter PC.

The branch instruction issuance scheduler 3 includes a branch instruction completion queue 4 of a first-in, first-out (FIFO) type. The branch instruction completion queue 4 includes multiple entries for holding information on branch instructions (conditional branch instructions or unconditional branch instructions) fetched by the address generation unit 1. In the branch instruction completion queue 4, an entry indicated by an output pointer (not illustrated) is also referred to as the top of queue (TOQ).

The branch instruction completion queue 4 holds information on uncompleted branch instructions from an entry corresponding to the TOQ to an entry indicated by an input pointer (not illustrated) in the order of description in a program. Information on a branch instruction whose processing has been completed is taken out from the TOQ after waiting until becoming the TOQ. In other words, completion processing of a branch instruction by the branch instruction issuance scheduler 3 is executed in order. In the following, information on a branch instruction held in the branch instruction completion queue 4 is also simply referred to as a branch instruction.

The branch instruction issuance scheduler 3 outputs a completion report to the branch prediction unit 5 in the case where a branch instruction held in the TOQ is determined to be taken or not taken by a calculation result or the like. In the case where an occurrence of a branch prediction miss of an uncompleted conditional branch instruction is detected, the branch instruction issuance scheduler 3 outputs an instruction refetch request to the address generation unit 1 and the branch prediction unit 5. The instruction refetch request is output not only for a conditional branch instruction in the TOQ, but also for a conditional branch instruction in an entry other than the TOQ.

The branch instruction issuance scheduler 3 invalidates branch instructions held in entries (the entries on the opposite side with respect to the TOQ) after the entry for which the instruction refetch request is output. In the case of outputting an instruction refetch request from an entry other than the TOQ, the branch instruction issuance scheduler 3 outputs a repair request to the branch prediction unit 5 for conditional branch instructions held between the TOQ and the entry for which the branch prediction miss is detected.

The branch prediction unit 5 includes a prediction holding unit 6. The branch prediction unit 5 uses information held in the prediction holding unit 6 to predict whether or not a branch by a conditional branch instruction is to be taken based on an address generated by the address generation unit 1, and in the case of predicting that the branch is to be taken, outputs an address indicating the branch destination to the address generation unit 1.

The prediction holding unit 6 includes multiple entries each holding information on one conditional branch instruction. Each entry holds prediction information including a prediction value of the consecutively taken branch count of the conditional branch instruction, the current taken branch count of the conditional branch instruction, and a prediction value of the remaining taken branch count of the conditional branch instruction. Further, the branch prediction unit 5 uses the prediction holding unit 6 to predict the consecutively taken branch count of the conditional branch instruction and a switch from a taken branch to a not-taken branch.

Note that only part of the addresses of the conditional branch instructions may be held in the prediction holding unit 6, and the remaining addresses may be used as indices for identifying entries of the prediction holding unit 6. In addition, in the case of predicting the consecutively not-taken branch count, in the prediction holding unit 6, the current not-taken branch count, a prediction value of the consecutively not-taken branch count, and a prediction value of the remaining not-taken branch count are held instead of the current taken branch count, a prediction value of the consecutively taken branch count, and a prediction value of the remaining taken branch count.

The current taken branch count indicates a consecutively taken branch count after the conditional branch instruction is not taken, and is incremented in response to each completion report of a taken branch of a conditional branch instruction from the branch instruction issuance scheduler 3. The current taken branch count is reset to "0" when a completion report of a conditional branch instruction indicates a not-taken branch. Note that in the case of predicting the consecutively not-taken branch count of a conditional branch instruction and a switch from a not-taken branch to a taken branch, the current not-taken branch count is incremented in response to each completion report of a not-taken branch of the conditional branch instruction, or reset to "0" when a completion report of the conditional branch instruction is a taken branch.

The prediction value of the consecutively taken branch count indicates a prediction value of the remaining number of times that the branch by the conditional branch instruction is consecutively taken. For example, in the case where the prediction value of the consecutively taken branch count is "30", and the prediction value of the remaining taken branch count is from "0" to "29", the branch prediction unit 5 predicts that the conditional branch instruction will be taken next time. In the case where the prediction value of the remaining taken branch count is "30", the branch prediction unit 5 predicts that the conditional branch instruction will not be taken next time.

Before starting branch prediction, the branch prediction unit 5 obtains the consecutively taken branch count (e.g., the loop count) until the conditional branch instruction becomes a not-taken branch based on the completion report for each conditional branch instruction. For example, in the case where the consecutively taken branch count takes the same value twice in a row, the branch prediction unit 5 sets the consecutively taken branch count to the prediction value of the consecutively taken branch count, and starts branch prediction of the conditional branch instruction in which the prediction value of the consecutively taken branch count is set.

Note that in the case of predicting the consecutively not-taken branch count, the prediction value of the consecutively not-taken branch count used instead of the prediction value of the consecutively taken branch count indicates a prediction value of the remaining number of times that the branch by the conditional branch instruction is consecutively not taken. For example, in the case where the prediction value of the consecutively not-taken branch count is "30", and the prediction value of the remaining not-taken branch count is from "0" to "29", the branch prediction unit 5 predicts that the conditional branch instruction will not be taken next time. In the case where the prediction value of the remaining not-taken branch count is "30", the branch prediction unit 5 predicts that the conditional branch instruction will be taken next time.

The prediction value of the remaining taken branch count is updated when a conditional branch instruction is fetched, when an instruction refetch request is generated, or when a repair request is generated. Based on the reception of the fetch address of the conditional branch instruction, in the case where the prediction value of the remaining taken branch count in the corresponding entry is not "0", the branch prediction unit 5 decrements the prediction value of the remaining taken branch count. Based on the reception of the fetch address of the conditional branch instruction, in the case where the prediction value of the remaining taken branch count in the corresponding entry is "0", the branch prediction unit 5 sets the prediction value of the consecutively taken branch count to the prediction value of the remaining taken branch count. Further, the branch prediction unit 5 predicts a taken branch or not-taken branch of a conditional branch instruction, by using the prediction value of the consecutively taken branch count updated upon an instruction fetch.

In the case where an instruction refetch request for a conditional branch instruction held in an entry other than the TOQ of the branch instruction completion queue 4 is received, the branch prediction unit 5 sets a value obtained by subtracting the current taken branch count from the prediction value of the consecutively taken branch count of the entry holding the uncompleted conditional branch instruction in the instruction loop, to the prediction value of the remaining taken branch count. The instruction loop will be described with reference to FIG. 4. Further, in response to a repair request from the branch instruction issuance scheduler 3, the branch prediction unit 5 decrements the prediction value of the remaining taken branch count for each uncompleted conditional branch instruction in the instruction loop. Note that upon processing the repair request, in the case where the prediction value of the remaining taken branch count of the uncompleted conditional branch instruction in the instruction loop is "0", the branch prediction unit 5 sets the prediction value of the consecutively taken branch count to the prediction value of the remaining taken branch count.

Accordingly, even in the case where the instruction refetch request is output out of order from an entry other than the TOQ, the prediction value of the remaining taken branch count of the uncompleted conditional branch instruction can be updated to an appropriate value. Therefore, a decrease can be suppressed in the prediction accuracy of the prediction value of the remaining taken branch count of the conditional branch instruction in the instruction loop, after the instruction refetch of the conditional branch instruction in which the branch prediction miss occurs in an entry other than the TOQ. An example of updating the prediction value of the remaining taken branch count in the case where an instruction refetch request is output corresponding to an entry other than the TOQ will be described with reference to FIGS. 3 and 4.

Note that in the case of predicting the consecutively not-taken branch count, and an instruction refetch request for a conditional branch instruction held in an entry other than the TOQ is received, the branch prediction unit 5 sets, for an uncompleted conditional branch instruction, a value obtained by subtracting the current not-taken branch count from the prediction value of the consecutively not-taken branch count as the prediction value of the remaining not-taken branch count. However, in the case where the prediction value of the remaining not-taken branch count of the uncompleted conditional branch instruction is "0", the branch prediction unit 5 sets the prediction value of the consecutively not-taken branch count to the prediction value of the remaining not-taken branch count.

Figure 2:
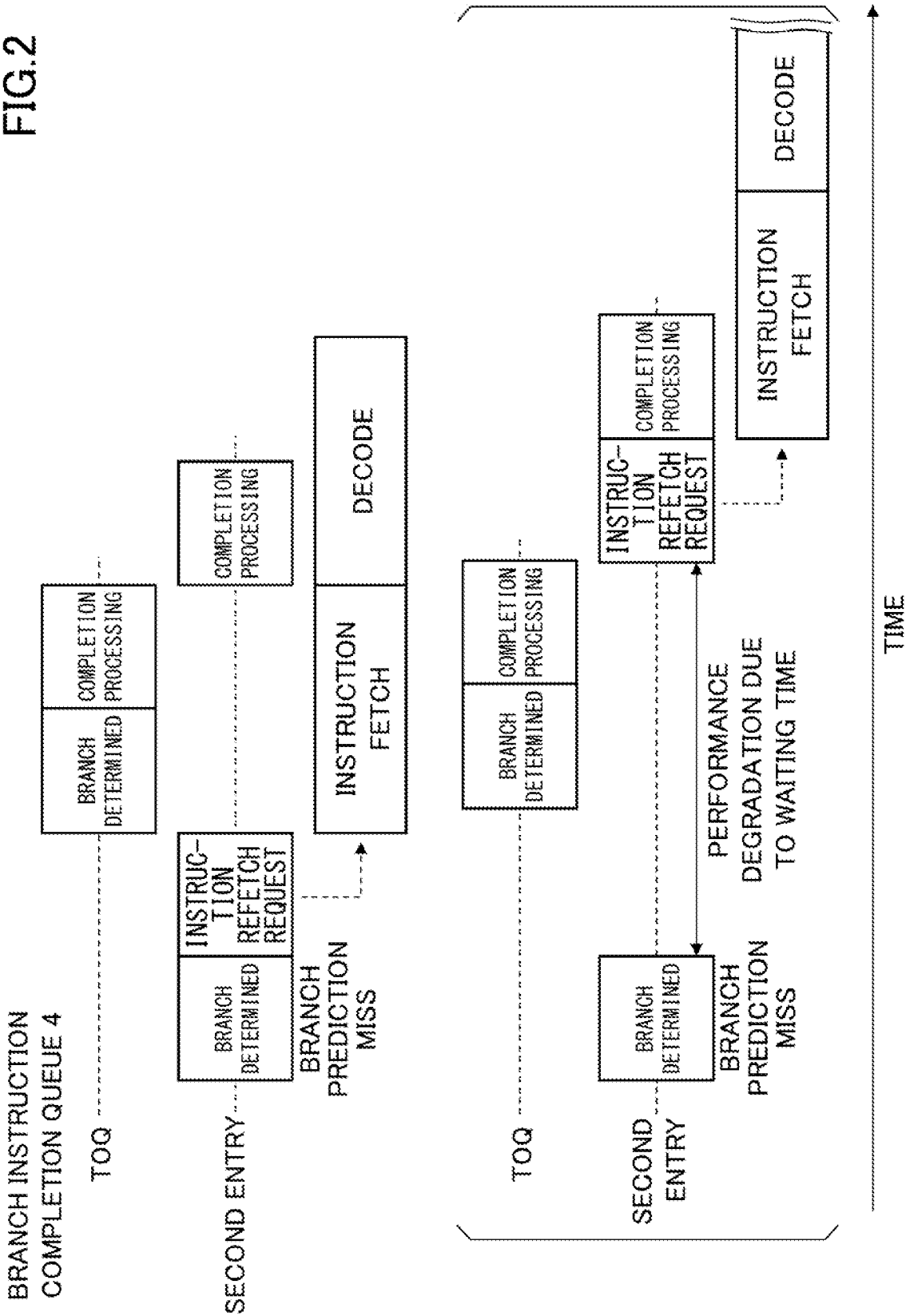
FIG. 2 is an explanatory diagram illustrating an example of operations of the arithmetic processing device in FIG. 1 when executing branch instructions.

FIG. 2 illustrates an example of operations of the arithmetic processing device 100 in FIG. 1 when executing branch instructions. In the case where processing of the branch instruction held in one of the entries of the branch instruction completion queue 4 is determined in the completion processing of the branch instruction, the branch instruction issuance scheduler 3 waits until the entry holding the branch instruction becomes the TOQ, and executes the completion processing of the branch instruction. In the example illustrated in FIG. 2, before processing of the branch instruction held in the TOQ of the branch instruction completion queue 4 is determined, a branch prediction miss of a conditional branch instruction held in the second entry of the branch instruction completion queue 4 is detected.

On the upper side in FIG. 2, in the case where the branch instruction issuance scheduler 3 detects a branch prediction miss of a branch instruction held in one of the entries of the branch instruction completion queue 4, the branch instruction issuance scheduler 3 outputs an instruction refetch request without waiting until the entry holding the branch instruction becomes the TOQ. Further, when the entry holding the branch instruction becomes the TOQ, the completion processing of the branch instruction is executed.

Accordingly, without waiting until the entry holding the conditional branch instruction for which the branch prediction miss has occurred becomes the TOQ, an instruction fetch for the instruction refetch request can be executed, and the fetched instruction can be decoded. As a result, the processing of the instruction fetch pipeline for the instruction refetch request can be hidden, and the processing efficiency of the pipeline can be improved.

In the case where a branch prediction miss is determined, the arithmetic processing device 100 outputs an instruction refetch request of the conditional branch instruction with the correct address from the branch instruction issuance scheduler 3 to the address generation unit 1, and clears the stage of the pipeline executed corresponding to the branch prediction miss.

In the brackets on the lower side in FIG. 2, operations of another arithmetic processing device are illustrated, to execute refetching of instructions in order according to the order in which the instructions are written in a program. For example, in the case where a branch prediction miss is determined, the other arithmetic processing device outputs an instruction refetch request after the entry holding the conditional branch instruction for which the branch prediction miss occurs becomes the TOQ.

In this case, the timing of the instruction fetch for the instruction refetch request is delayed from the timing illustrated on the upper side in FIG. 2, and performance degradation occurs due to the waiting time from the determination of the branch prediction miss to the output of the instruction refetch request.

Figure 3:
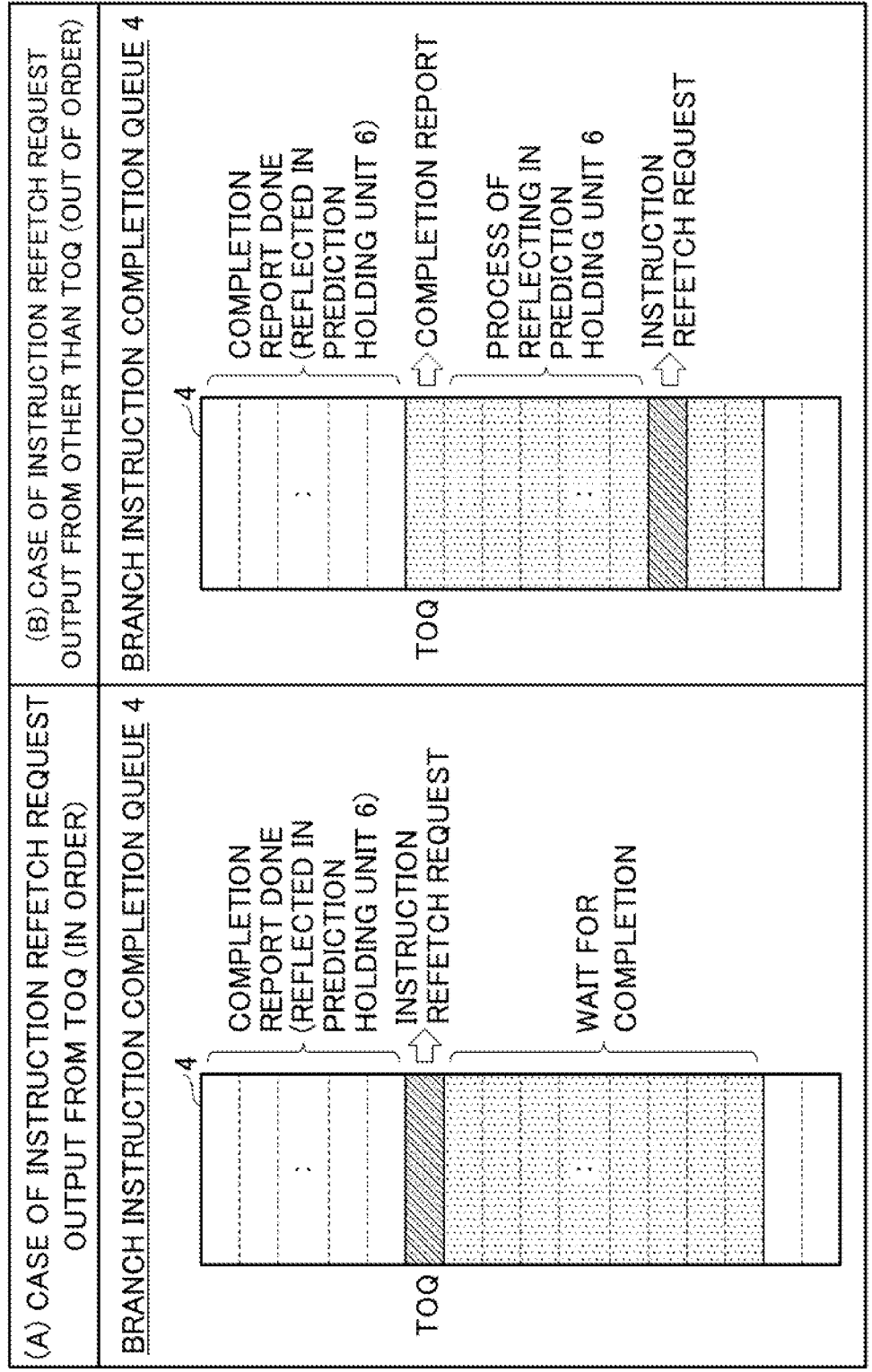
FIG. 3 is an explanatory diagram illustrating an example in which a branch instruction issuance scheduler in FIG. 1 outputs an instruction refetch request in order or out of order.

FIG. 3 illustrates an example in which the branch instruction issuance scheduler 3 in FIG. 1 outputs an instruction refetch request in order or out of order. The term "in order" indicates that an instruction refetch request is output for a conditional branch instruction held in the TOQ of the branch instruction completion queue 4. The term "out of order" indicates that an instruction refetch request is output for a conditional branch instruction held in an entry other than the TOQ of the branch instruction completion queue 4. An entry shaded with oblique lines indicates that this entry holds a conditional branch instruction for which an instruction refetch request is to be output. An entry shaded with dots indicates that this entry holds a conditional branch instruction waiting for completion.

In FIG. 3, in (A) illustrating a case where an instruction refetch request of a conditional branch instruction held in the TOQ is output, a conditional branch instruction preceding the conditional branch instruction as the target of the instruction refetch request has already been reflected in the prediction holding unit 6. Accordingly, the prediction value of the remaining taken branch count can be updated appropriately, and a decrease in the prediction accuracy can be suppressed.

On the other hand, in FIG. 3, in (B) illustrating a case where an instruction refetch request for a conditional branch instruction held in an entry other than the TOQ is output, at least one of the entries preceding (on the TOQ side of) the conditional branch instruction as the target of the instruction refetch request may not hold a conditional branch instruction waiting for completion. Further, the information on the prediction holding unit 6 corresponding to the conditional branch instruction waiting for completion is not updated.

Therefore, as described above, the instruction issuance scheduler 3 outputs a repair request corresponding to the conditional branch instruction waiting for completion, and the branch prediction unit 5 updates the prediction value of the remaining taken branch count of the prediction holding unit 6 corresponding to the conditional branch instruction waiting for completion based on the repair request.

Note that in (A) and (B) in FIG. 3, branch instructions held by entries after the entry holding the conditional branch instruction as the target of the instruction refetch request (on the side opposite to the TOQ) are invalidated.

Figure 4:
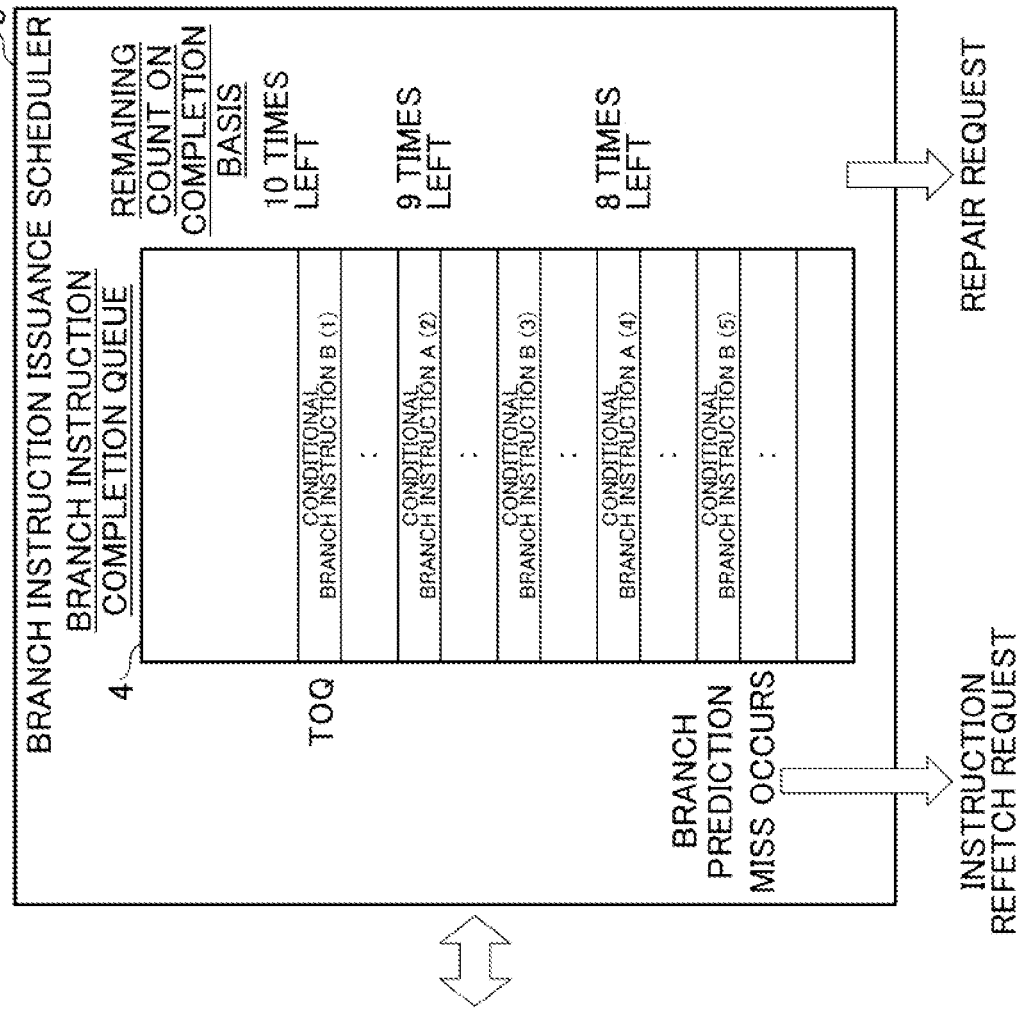
FIG. 4 is an explanatory diagram illustrating an example of an instruction loop including conditional branch instructions, and an example of operations of the branch instruction issuance scheduler when the instruction loop is processed.

FIG. 4 illustrates an example of an instruction loop including conditional branch instructions, and an example of operations of the branch instruction issuance scheduler 3 when the instruction loop is processed. In FIG. 4, assume that only conditional branch instructions A and B illustrated in an instruction sequence are executed.

In addition, in FIG. 4, assume that the conditional branch instruction B is not registered in an entry of the prediction holding unit 6, or that the entry of the prediction holding unit 6 corresponding to the conditional branch instruction B is not valid. Here, in the case where the conditional branch instruction B has never been completed once, the conditional branch instruction B is not registered in the prediction holding unit 6. In addition, in the case where the consecutively taken branch count of the conditional branch instruction B is not repeated multiple times, the information on the conditional branch instruction B held in the prediction holding unit 6 is not valid.

The instruction sequence illustrated in FIG. 4 has an instruction loop by a conditional branch instruction A, and a conditional branch instruction B for determining whether to skip a predetermined number of instructions in the forward direction during the instruction loop by the conditional branch instruction A. When the instruction sequence in such an instruction loop is processed, the conditional branch instructions A and B are alternately held in the branch instruction completion queue 4 of the branch instruction issuance scheduler 3.

In the conditional branch instruction B(5), with respect to prediction of a not-taken branch by the branch prediction unit 5, the execution result of the conditional branch instruction B(5) is a taken branch, and a branch prediction miss occurs. In the conditional branch instruction A completed immediately before the instruction refetch request is output, assume that the remaining taken branch count on the completion basis is 10. Here, the remaining taken branch count on the completion basis is indicated by a difference between the prediction value of the consecutively taken branch count and the current taken branch count.

At a point of time when the instruction refetch request is output, the remaining taken branch count on the completion basis for the conditional branch instruction A(2) is nine, and the remaining taken branch count on the completion basis for conditional branch instruction A(4) is eight. The remaining taken branch count on the completion basis is normally greater than the prediction value of the remaining taken branch count that is updated on the fetch basis.

As described above, at a point of time when the address generation unit starts the instruction refetch from the jump destination of the conditional branch instruction B(5) based on the instruction refetch request, the remaining taken branch count on the completion basis of the conditional branch instruction A is 10. However, uncompleted entries of the conditional branch instruction A(2) and the conditional branch instruction A(4) exist between the TOQ and the entry holding the conditional branch instruction B(5). Therefore, in order to avoid lowering the branch prediction accuracy of the conditional branch instruction A, it is favorable that, when the prediction holding unit 6 is updated based on the instruction refetch request of the conditional branch instruction B, the prediction value of the remaining taken branch count of the conditional branch instruction A is set to eight.

In the case where the conditional branch instruction A(2) and the conditional branch instruction A(4) are ignored and the prediction value of the remaining taken branch count is set to 10, the prediction value of the remaining taken branch count becomes two times more than the number of times to be originally updated. In this case, as the branch prediction unit 5 predicts a taken branch instead of a not-taken branch, a branch prediction miss occurs.

In order to reduce the frequency of branch prediction misses and suppress a decrease in the prediction accuracy, in the case where a branch prediction miss occurs in an entry other than the TOQ and an instruction refetch request is output, the branch instruction issuance scheduler 3 outputs a repair request to the branch prediction unit 5 to correct the prediction value of the remaining taken branch count. For example, the repair request is output such that the conditional branch instruction can be identified for each uncompleted conditional branch instruction held in the entry between the TOB and the entry holding the conditional branch instruction of the target of the instruction refetch request.

In the case where an entry of the prediction holding unit 6 holding the information on a conditional branch instruction corresponding to the repair request is valid, the branch prediction unit 5 updates the prediction value of the remaining taken branch count. Accordingly, even in the case where the instruction refetch request of the conditional branch instruction held in an entry other than the TOQ is output, a decrease in the branch prediction accuracy by the branch prediction unit 5 can be suppressed.

Note that in some cases, multiple conditional branch instructions with different addresses are present between the TOQ and an entry holding a conditional branch instruction as the target of the instruction refetch request. In this case, the branch instruction issuance scheduler 3 outputs repair requests corresponding to the number of conditional branch instructions for the respective conditional branch instructions having different addresses.

As above, in the present embodiment, even in the case where the instruction refetch request is output out of order from an entry other than the TOQ, the prediction value of the remaining taken branch count of an uncompleted conditional branch instruction can be updated to an appropriate value. Therefore, a decrease can be suppressed in the prediction accuracy of the prediction value of the remaining taken branch count of a conditional branch instruction in an instruction loop, after the instruction refetch of the conditional branch instruction in which the branch prediction miss occurs in an entry other than the TOQ. As a result, the processing efficiency of the pipeline can be improved, and the processing performance of the arithmetic processing device 100 can be improved.

Thanks to the improvement in the processing performance of the arithmetic processing device 100, the processing performance can be improved on a system such as a server on which the arithmetic processing device 100 is installed, and the time required for scientific and technical calculation, deep learning, various simulations, and the like can be shortened.

Without waiting until an entry holding a conditional branch instruction whose branch prediction is missed becomes the TOQ in the branch instruction completion queue 4, an instruction fetch for the instruction refetch request can be executed, and the fetched instruction can be decoded. As a result, the processing of the instruction fetch pipeline for the instruction refetch request can be hidden, and the processing efficiency of the pipeline can be improved.

The branch prediction unit 5 decrements the prediction value of the remaining taken branch count of an entry corresponding to an uncompleted conditional branch instruction corresponding to a repair request from the branch instruction issuance scheduler 3, or sets it to the prediction value of the consecutively taken branch count. Accordingly, even in the case where the instruction refetch request is output out of order from an entry other than the TOQ, the prediction value of the remaining taken branch count of the uncompleted conditional branch instruction can be updated to an appropriate value. Therefore, after the conditional branch instruction with which a branch prediction miss occurred is refetched, a decrease in the prediction accuracy of the prediction value of the remaining taken branch count of the conditional branch instruction can be suppressed.

In the prediction holding unit 6, the current not-taken branch count, the past not-taken branch count, and a prediction value of the remaining not-taken branch count can be held, instead of the current taken branch count, a prediction value of the consecutively taken branch count, and a prediction value of the remaining taken branch count. Accordingly, the prediction holding unit 6 can be used not only for predicting the consecutively taken branch count of a conditional branch instruction, but also for predicting the consecutively not-taken branch count of a conditional branch instruction.

Figure 5:
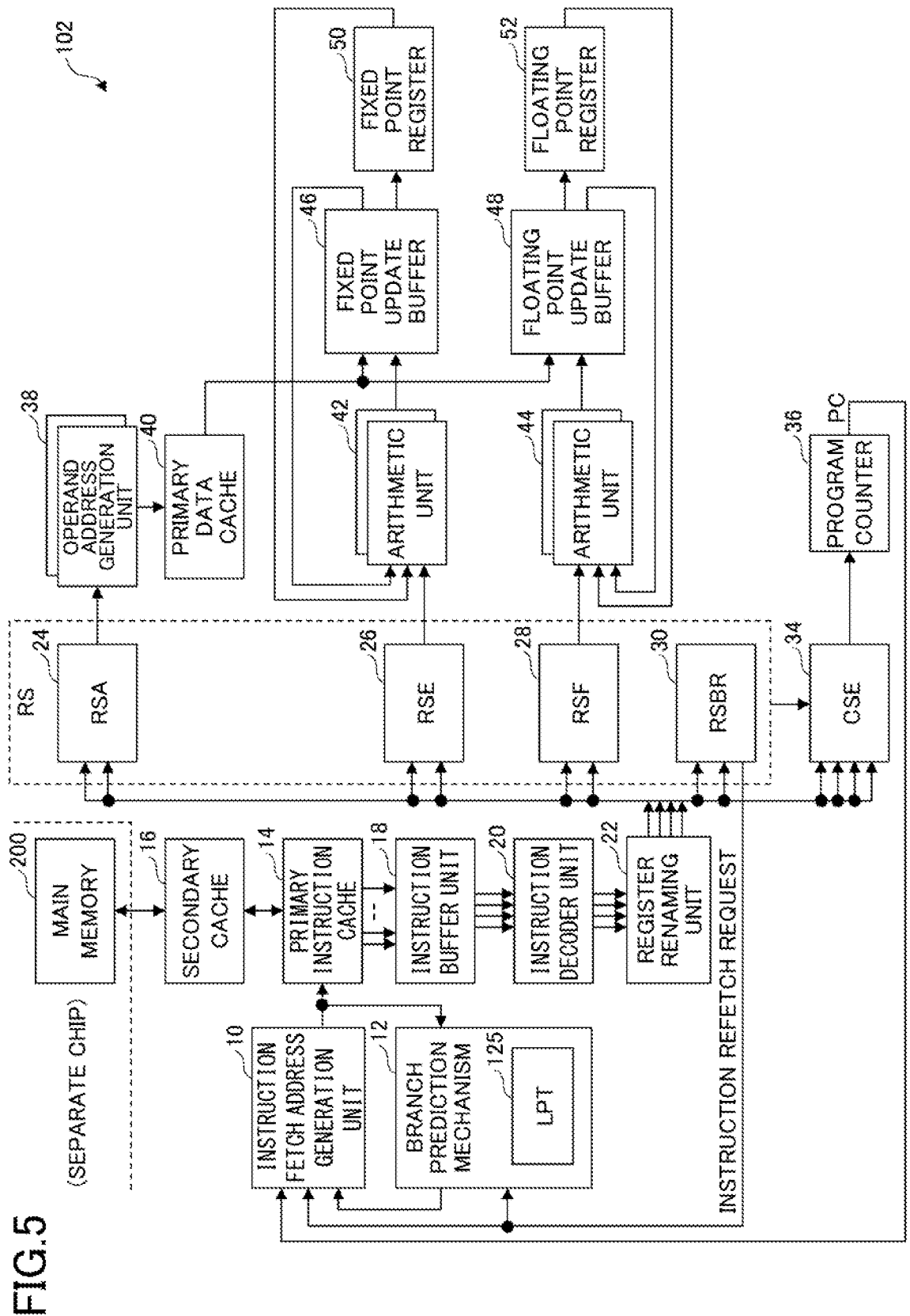
FIG. 5 is a block diagram illustrating an example of an arithmetic processing device in another embodiment.

FIG. 5 illustrates an example of an arithmetic processing device in another embodiment. Elements and functions that are the same as or similar to those described in FIGS. 1 to 4 will not be described in detail.

An arithmetic processing device 102 illustrated in FIG. 5 includes an instruction fetch address generation unit 10, a branch prediction mechanism 12, a primary instruction cache 14, a secondary cache 16, an instruction buffer unit 18, an instruction decoder unit 20, and a register renaming unit 22. The instruction fetch address generation unit 10 is an example of an address generator configured to generate a fetch address of an instruction.

In addition, the arithmetic processing device 102 includes a reservation station RS, a commit control unit 34, and a program counter 36. In the following, the commit control unit 34 is also referred to as a commit stack entry (CSE) 34. The reservation station RS includes a reservation station for address generation (RSA) 24, a reservation station for execution (RSE) 26, a reservation station for floating point (RSF) 28, and a reservation station for branch (RSBR) 30. In the following, in the case where the RSA 24, the RSE 26, the RSF 28, and the RSBR 30 are not distinguished from each other, these are also referred to as the reservation station(s) RS.

Further, the arithmetic processing device 102 includes an operand address generation unit 38, a primary data cache 40, arithmetic units 42 and 44, a fixed point update buffer 46, a floating point update buffer 48, the fixed point register 50, and the floating point register 52. In the following, the fixed point update buffer 46 and the floating point update buffer 48 are also referred to as the update buffer 46 and the update buffer 48, respectively. The fixed point register 50 and the floating point register 52 are also referred to as the register 50 and the register 52, respectively.

The instruction fetch address generation unit 10 generates a fetch address of the next instruction based on the value of the program counter 36, a prediction result by the branch prediction mechanism 12, or an address included in an instruction refetch request from the RSBR 30. The instruction fetch address generation unit 10 outputs the generated fetch address of the next instruction to the primary instruction cache 14, and fetches an instruction from the primary instruction cache 14.

Figure 7:
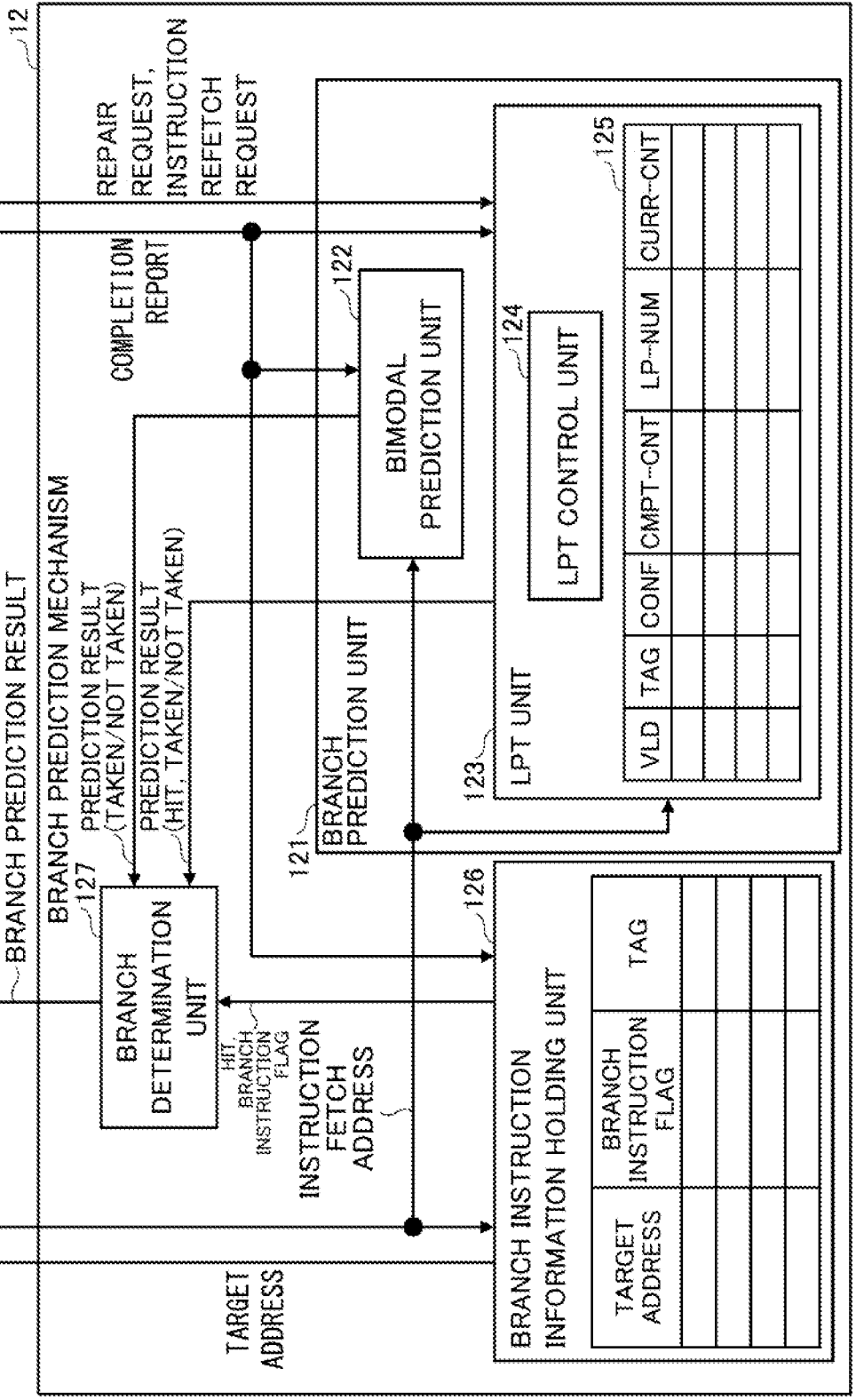
FIG. 7 is a block diagram illustrating an example of a branch prediction mechanism in FIG. 5.

The branch prediction mechanism 12 includes a local pattern table (LPT) 125. Based on the address generated by instruction fetch address generation unit 10, the branch prediction mechanism 12 uses the LPT 125 to predict whether or not a branch by a conditional branch instruction is executed. In the case where a branch is predicted (branch is to be taken), the branch prediction mechanism 12 outputs a branch destination address (target address) to the instruction fetch address generation unit 10. An example of the branch prediction mechanism 12 is illustrated in FIG. 7.

The primary instruction cache 14 fetches an instruction from an area indicated by the address from the instruction fetch address generation unit 10, and outputs the fetched instruction to the instruction buffer unit 18. Instructions held by the primary instruction cache 14 include arithmetic instructions executed by using the arithmetic units 42 and 44, memory access instructions, and branch instructions. In the case where the primary instruction cache 14 does not hold the instruction of the area indicated by the address, the primary instruction cache 14 outputs an access request to the secondary cache 16, to fetch the instruction from the secondary cache 16.

The secondary cache 16 extracts an instruction from the area indicated by the address included in the access request, and outputs the extracted instruction to the primary instruction cache 14. In the case where the secondary cache 16 does not hold the instruction of the area indicated by the address, the primary instruction cache 14 outputs an access request to the main memory 210, to fetch the instruction from the main memory 210. For example, the main memory 210 is included in a semiconductor chip different from the semiconductor chip including the arithmetic processing device 102. Note that the secondary cache may hold data as well as instructions.

The instruction buffer unit 18 holds multiple instructions output from the primary instruction cache 14 in parallel, and outputs the held instructions to the instruction decoder unit 20 in parallel. For example, the instruction buffer unit 18 outputs four instructions in parallel to the instruction decoder unit 20. Note that the number of instructions output in parallel from the primary instruction cache 14 to the instruction buffer unit 18 is greater than four.

The instruction decoder unit 20 includes multiple decode slots for decoding multiple instructions output from the instruction buffer unit 18 in parallel. Although not limited in particular, the number of decoding slots is four. Each decode slot determines a reservation station RS (the RSA 24, the RSE 26, the RSF 28, or the RSBR 30) corresponding to the arithmetic unit 42, 44, or the like to execute instructions. Each decode slot adds information or the like indicating the reservation station RS of the output destination of the instruction to the instruction, and outputs the instruction to which the information is added to the register renaming unit 22.

In addition, the instruction decoder unit 20 assigns an instruction identifier (IID) to an instruction according to the order of description in a program executed by the arithmetic processing device 102, and outputs the assigned instruction identifier to the CSE 34 together with the decoded instruction (decoding result). Note that the instruction buffer unit 18 and the instruction decoder unit 20 process multiple instructions in parallel without changing the order of description in the program (in order).

To allow out of order execution, the register renaming unit 22 allocates an entry of the update buffer 46 (or 48) to be used instead of the register 50 (or 52) designated by an instruction operand in the case where the instruction is executed. The register renaming unit 22 outputs the instruction output from the instruction decoder unit 20 together with information representing the assigned entry of the update buffer 46 (or 48) to the reservation station RS to execute the instruction. Note that the instruction output from the instruction decoder unit 20 includes information representing to which reservation station RS the instruction is output.

For example, in the case where the instruction decoded by the instruction decoder unit 20 is a memory access instruction (a load instruction or a store instruction), the instruction is output to the RSA 24. In the case where the instruction decoded by the instruction decoder unit 20 is a fixed point number arithmetic instruction, the instruction is output to the RSE 26. In the case where the instruction decoded by the instruction decoder unit 20 is a floating point number arithmetic instruction, the instruction is output to the RSF 28. In the case where the instruction decoded by the instruction decoder unit 20 is a branch instruction, the instruction is output to the RSBR 30.

The RSA 24 holds memory access instructions sequentially received from the instruction decoder unit 20, and outputs the held memory access instructions to the operand address generation unit 38 in an executable order (out of order). The operand address generation unit 38 generates an address based on the memory access instruction received from the reservation station RSA, and outputs the generated address to the primary data cache 40. Note that although the arithmetic processing device 102 includes multiple operand address generation units 38 in FIG. 5, the number of operand address generation units 38 may be one.

For example, in the case where a load instruction is executed, the primary data cache 40 fetches data held in an area indicated by an address from the operand address generation unit 38, and outputs the fetched data to the update buffer 46 or the update buffer 48. Similar to the primary instruction cache 14, in the case where the primary data cache 40 does not hold data of the area indicated by the address, the primary instruction cache 14 outputs an access request to the secondary cache 16, to fetch the data from the secondary cache 16.

The RSE 26 holds fixed point number arithmetic instructions sequentially received from the instruction decoder unit 20, and outputs the held instructions to the arithmetic unit 42 in an executable order (out of order). The RSF 28 holds floating point number arithmetic instructions sequentially received from the instruction decoder unit 20, and outputs the held instructions to the arithmetic unit 44 in an executable order (out of order).

Figure 6:
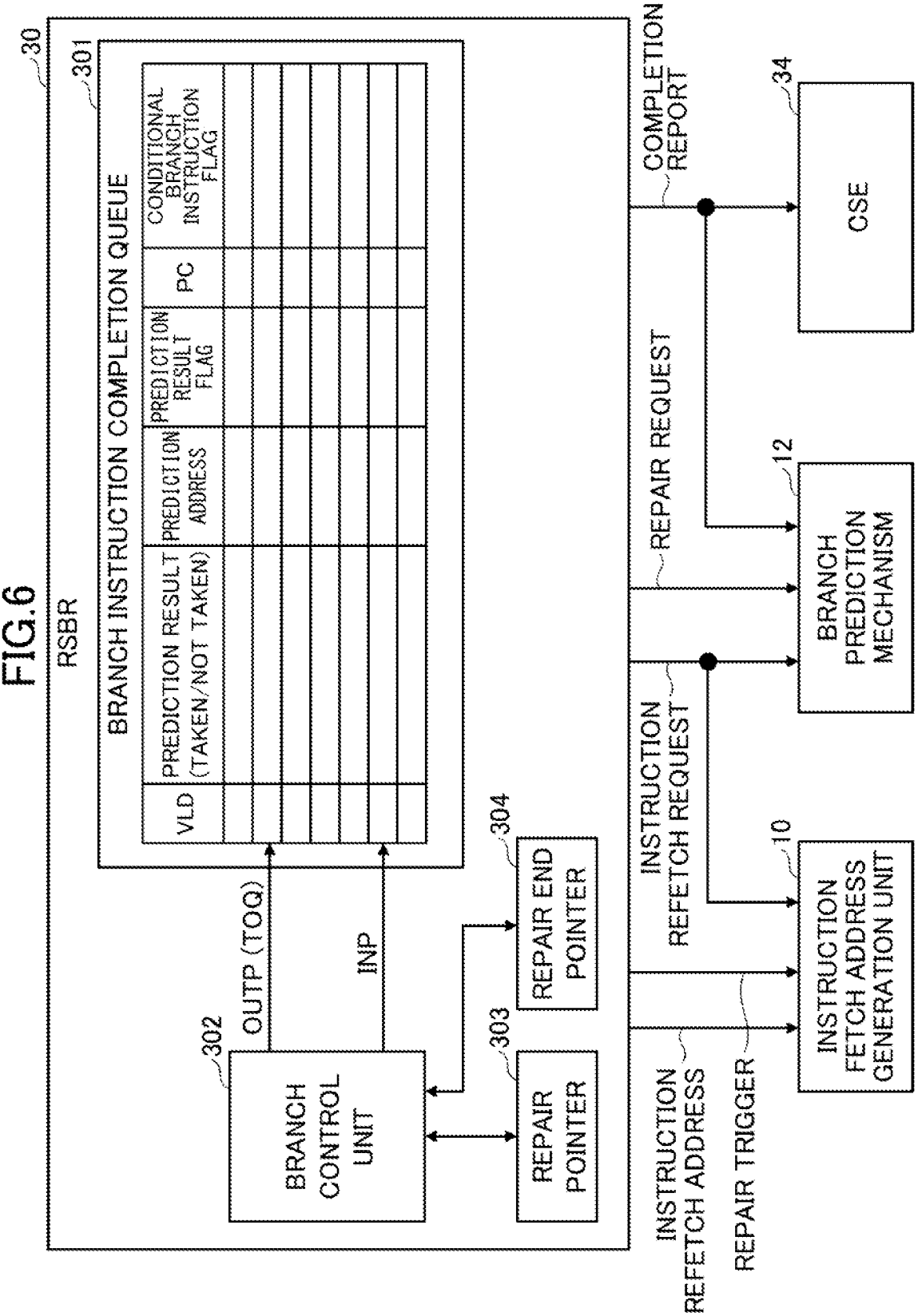
FIG. 6 is a block diagram illustrating an example of an RSBR in FIG. 5.

The RSBR 30 holds branch instructions sequentially received from the instruction decoder unit 20 until the branch is determined to be taken or not to be taken, and a completion report is output. The RSBR 30 executes completion processing of the branch instruction in order, notifies the CSE 34 of a completion signal, and causes the CSE 34 to commit the branch instruction. In the case where a branch prediction miss is determined, the RSBR 30 outputs an instruction refetch request to the instruction fetch address generation unit 10 and the branch prediction mechanism 12. An example of the RSBR 30 is illustrated in FIG. 6.

The CSE 34 includes a queue that stores instructions received via the register renaming unit 22 in the order described in a program, and a completion processing unit to execute completion processing of the instructions. The completion processing unit executes completion processing of instructions in order according to the order described in the program, based on the completion report of the instructions executed in each reservation station RS and the information on the queue. In the completion processing, the completion processing unit commits (ends) the instruction corresponding to the completion report among instructions waiting for completion reports accumulated in the queue of the CSE 34, and updates the resources.

The program counter 36 updates the memory address indicating the storage destination of the instruction based on a command from the commit control unit 34, and outputs the updated memory address to the instruction fetch address generation unit 10 as the program counter PC.

The arithmetic unit 42 is an arithmetic unit for fixed point numbers. The arithmetic processing device 102 may be provided with multiple arithmetic units 42 to execute in parallel fixed point number arithmetic instructions decoded in parallel by the instruction decoder unit 20. The arithmetic unit 42 obtains data to be used for an operation from the update buffer 46 or the register 50, and stores an operation result in the update buffer 46.

The arithmetic unit 44 is an arithmetic unit for floating point numbers. For example, the arithmetic processing device 102 may be provided with multiple arithmetic units 44 to execute in parallel floating point number arithmetic instructions decoded in parallel by the instruction decoder unit 20. The arithmetic unit 44 obtains data to be used for an operation from the update buffer 48 or the register 52, and stores an operation result in the update buffer 48. Note that the arithmetic unit 44 may include an arithmetic unit to execute a product-sum operation, an integer operation, a logical operation, and the like.

The update buffer 46 includes multiple entries for holding data used for arithmetic operations executed by the arithmetic unit 42 and a management unit for managing correspondence between the entries and individual registers in the register 50. The update buffer 48 includes multiple entries for holding data used for arithmetic operations executed by the arithmetic unit 44, and a management unit for managing correspondence between the entries and individual registers in the register 52.

The register 50 includes multiple entries for holding data used for an operation executed by the arithmetic unit 42 and an execution result of the operation by the arithmetic unit 42. The register 52 includes multiple entries for holding data used for an operation executed by the arithmetic unit 44 and an execution result of the operation by the arithmetic unit 44.

For example, the register 50 includes 32 fixed point registers each configured to have 64 bits, and the registers 52 includes 32 floating point registers each configured to have 512 bits. Note that the number of registers and the number of bits in each of the registers 50 and 52 may be other than those described above. In addition, the bit configuration of the register of the register 52 for floating point numbers may be configured to be variable.

Note that the circuit elements of the arithmetic processing device 102 illustrated in FIG. 5 are divided into multiple stages by flip-flops (not illustrated), and the arithmetic processing device 102 executes an instructions by pipeline processing. For example, the stages of the pipeline include a decode stage, a decode transfer stage, a priority stage, a priority transfer stage, a buffer stage, an execute stage, and a write back stage.

In the decode stage, an instruction is decoded by the instruction decoder unit 20. In the decode transfer stage, the instruction decoded by the instruction decoder unit 20 is output to the RSE 26, the RSF 28, or the like. In the priority stage, an instruction to be output to the arithmetic unit 42 is determined by, for example, the RSE 26.

In the priority transfer stage, for example, an instruction is output from the RSE 26 to the arithmetic unit 42. In the buffer stage, operands to be used for an operation are read from the update buffers 46 and 48 or the registers 50 and 52. In the execution stage, an operation is executed by the arithmetic unit 42 or the arithmetic unit 44. In the write back stage, the result of an operation executed by the arithmetic unit 42 or 44 is stored in the update buffer 46 or 48.

FIG. 6 illustrates an example of the RSBR 30 in FIG. 5. The RSBR 30 includes a FIFO-type branch instruction completion queue 301, a branch control unit 302, a repair pointer 303, and a repair end pointer 304. The branch instruction completion queue 301 includes multiple entries each holding a valid flag VLD, a prediction result (branch is to be taken or not) of a branch predicted by the branch prediction mechanism 12, a prediction address, a prediction result flag, a program counter PC, and a conditional branch instruction flag. The branch instruction completion queue 301 is managed by the branch control unit 302 using an output pointer OUTP and an input pointer INP.

In the branch instruction completion queue 301, information on branch instructions from decoding to completion of the processing is held in entries in a range from the input pointer INP to the output pointer OUTP in the order of description in a program. The valid flag VLD is set for a valid entry. Information on branch instructions whose processing has been completed is extracted only from the entry indicated by the output pointer OUTP. In other words, completion processing of branch instructions by the RSBR 30 is executed in order. A branch instruction held in an entry indicated by the output pointer OUTP is the branch instruction at the head whose processing has not been completed. In the following, the entry indicated by the output pointer OUTP is also referred to as the TOQ.

In the case where the branch prediction mechanism 12 predicts that a branch is to be taken (in the case where the address indicated by the program counter PC is changed to the jump destination), information on the branch to be taken is held in the prediction result area. In the case where the branch prediction mechanism 12 predicts that the branch is not to be taken (in the case where the address indicated by the program counter PC is incremented), the information on the branch not to be taken is held in the prediction result area.

In the prediction address area, the address of the jump destination predicted by the branch prediction mechanism 12 is held. In the prediction result flag area, information indicating whether the prediction result of the branch prediction mechanism 12 is correct or incorrect is held. In the program counter PC area, the address where the conditional branch instruction is stored is held as a program counter PC. In the conditional branch instruction flag area, for example, "1" is set in the case where a conditional branch instruction is held.

The branch control unit 302 outputs a completion report to the branch prediction mechanism 12 together with the program counter PC and the conditional branch instruction flag held in the branch instruction completion queue 301. The branch prediction mechanism 12 updates the LPT 125 based on the completion report from the RSBR 30, the program counter PC, and the conditional branch instruction flag.

In the present embodiment, the branch control unit 302 executes the completion processing of the branch instruction in order, but can execute the instruction refetch request accompanying the branch prediction miss out of order. In other words, the branch control unit 302 may output an instruction refetch request without waiting for the entry holding the conditional branch instruction as the target of the instruction refetch request to become the TOQ. Accordingly, the processing performance of the arithmetic processing device 102 can be improved.

The branch control unit 302 compares the prediction result by the branch prediction mechanism 12 with the execution result of the conditional branch instruction for each entry of the branch instruction completion queue 301, and determines whether the prediction is correct. For example, the branch control unit 302 determines the execution result of the conditional branch instruction based on an operation result of an instruction for determining a condition code flag NZCV of an ARM instruction set received from the arithmetic unit or the target address of the indirect branch instruction, and determines the target address.

The branch control unit 302 sets the prediction result flag to "1" in the case where the prediction of the branch prediction mechanism 12 is incorrect, and sets the prediction result flag to "0" in the case where the prediction of the branch prediction mechanism 12 is correct.

In the case where failure of the branch prediction of the conditional branch instruction is detected by the branch prediction mechanism 12, the branch control unit 302 outputs an instruction refetch request corresponding to the correct address to the instruction fetch address generation unit 10 and the branch prediction mechanism 12. The branch prediction mechanism 12 updates the LPT 125 based on the instruction refetch request.

The branch control unit 302 clears the valid flag VLD of an entry on the input pointer INP side with respect to the entry holding the conditional branch instruction as the target of the instruction refetch request, and prevents generation of a new entry. The branch control unit 302 outputs, to the pipeline to be cleared, a command to clear the pipeline in which an incorrect path is executed by the conditional branch instruction due to the failed branch prediction.

Based on the output of the instruction refetch request of the conditional branch instruction held in an entry other than the TOQ, the branch control unit 302 stores the identification number of the entry holding the conditional branch instruction as the target of the instruction refetch request as the repair end pointer 304, and sets a repair trigger. The repair pointer 303 is sequentially updated from the identification number of the TOQ to the identification number of the entry holding the conditional branch instruction as the target of the instruction refetch request.

The repair trigger is notified to the instruction fetch address generation unit 10. The repair trigger in a set state indicates that the LPT 125 is undergoing repair processing. The instruction fetch address generation unit 10 prevents instruction refetch based on the instruction refetch request while the repair trigger is set. Accordingly, the refetch of the conditional branch instruction with which the branch prediction miss has occurred can be prevented, the entry in the LPT 125 can be prevented from being updated, and the LPT 125 can be prevented from malfunctioning.

The branch control unit 302 sequentially updates the repair pointer 303 from the TOQ to the entry indicated by the repair end pointer. The branch control unit 302 sequentially reads the conditional branch instruction flag and the program counter PC held in an entry indicated by the repair pointer 303 of the branch instruction completion queue 301, until the repair pointer 303 matches the repair end pointer 304.

Every time reading the conditional branch instruction flag and the program counter PC, the branch control unit 302 outputs the conditional branch instruction flag and the program counter PC as a repair request to the LPT unit 123 of the branch prediction mechanism 12. In the case where there is an entry holding a conditional branch instruction of the program counter PC included in the repair request, the LPT unit 123 decrements the current count value CURR-CNT of the entry or sets the current count value CURR-CNT to a loop count LP-NUM.

The current count value CURR-CNT and the loop count LP-NUM correspond to the prediction value of the remaining taken branch count and the prediction value of the consecutively taken branch count in FIG. 1, respectively. The current count value CURR-CNT and the loop count LP-NUM will be described with reference to FIG. 7.

Accordingly, even in the case where the instruction refetch request is output from an entry other than the TOQ, the current count value CURR-CNT corresponding to the conditional branch instruction held in each of the entries from the TOQ to the repair end pointer 304 can be corrected to the original value. Here, the original value is a value that is updated in the case where the instruction refetch request is output from the TOQ.

Note that in the case where the instruction refetch request of the conditional branch instruction held in the TOQ is output, the repair process described below is not executed, and hence, the repair trigger is held in a reset state. In the case where the repair trigger is in a reset state, the instruction fetch address generation unit 10 outputs an address from which the instruction is to be refetched based on the instruction refetch request.

Note that in the case where it is determined that the instruction refetch request of a conditional branch instruction held in an entry of the branch instruction completion queue 301 is to be output, the branch control unit 302 searches for an entry that is closer to the TOQ for which the instruction refetch request is to be output. In the case where there are multiple entries to output the instruction refetch request, the branch control unit 302 determines to output instruction refetch requests starting from the entry closest to the TOQ.

FIG. 7 illustrates an example of the branch prediction mechanism 12 in FIG. 5. The branch prediction mechanism 12 includes a branch prediction unit 121 including a bimodal prediction unit 122 and an LPT unit 123, a branch instruction information holding unit 126, and a branch determination unit 127. The LPT unit 123 includes an LPT control unit 124 and an LPT 125. The LPT 125 is an example of a prediction holder.

The LPT unit 123 is a mechanism for predicting a pattern of consecutively taken branch count or not-taken count of a conditional branch instruction of a particular program counter PC. For example, in the case of a loop that is repeated upon a taken branch, the LPT unit 123 stores the taken branch count included in the loop, and predicts whether to repeat the loop upon a taken branch or to exit the loop upon a not-taken branch. In the case of a loop that is repeated upon a not-taken branch, the LPT unit 123 stores the not-taken branch count included in the loop, and predicts whether to repeat the loop upon a not-taken branch or to exit the loop upon to a taken branch. In the following, an example of predicting a pattern of a consecutively taken branch will be described unless otherwise noted. However, the LPT unit 64 can also be applied to predicting a pattern of a consecutively not-taken branch.

The LPT control unit 124 updates the contents of the LPT 125 based on a completion report, a repair request, and an instruction refetch request received from the RSBR 30; and an instruction fetch address received from the instruction fetch address generation unit 10.

The LPT control unit 124 executes branch prediction of a conditional branch instruction indicated by the instruction fetch address based on the contents of the updated LPT 125, and outputs a prediction result (hit, taken/not-taken) of the conditional branch instruction to the branch determination unit 127. "hit" is set if the branch prediction is valid, or reset if the branch prediction is invalid.

The LPT control unit 124 outputs information on the branch to be taken together with a hit in the case where the branch of the conditional branch instruction is taken (in the case where the program counter PC is changed to the jump destination). The LPT control unit 124 outputs information on the branch not to be taken together with a hit in the case where the branch of the conditional branch instruction is not taken (in the case where the program counter PC is incremented by "1").

The LPT 125 includes multiple entries each corresponding to one conditional branch instruction. The lower bits of the program counter PC are assigned to the multiple entries as indices, and each entry is identified by the lower bits of the program counter PC. In FIG. 7, for the sake of simplicity, only four entries are illustrated; however, a number of entries corresponding to the number of bits in the lower bits are provided.

Each entry in the LPT 125 includes an area for holding valid flag VLD, tag TAG, confidence CONF, completion count value CMPT-CNT, loop count LP-NUM, and current count value CURR-CNT. The completion count value CMPT-CNT is an example of a current taken branch count of a conditional branch instruction. The loop count LP-NUM is an example of a prediction value of the consecutively taken branch count of the conditional branch instruction. The current count value CURR-CNT is an example of a prediction value of the remaining taken branch count of the conditional branch instruction.

The valid flag VLD is set in the case where the entry is valid, and reset in the case where the entry is invalid. In the following, an entry in which the valid flag VLD is set is also referred to as a valid entry, and an entry in which the valid flag VLD is reset is also referred to as an invalid entry. The tag TAG indicates the upper bits of the program counter PC of the conditional branch instruction. Further, each conditional branch instruction is identified by the tag TAG and the index of the LPT 125.

The confidence CONF is a numerical value indicating a barometer of the likelihood of branch prediction. An entry whose confidence CONF is greater than or equal to a predetermined likelihood (threshold value) is used for branch prediction. An entry whose confidence CONF is less than the predetermined likelihood and an invalid entry are not used for branch prediction. The update of the confidence CONF will be described later.

The completion count value CMPT-CNT is incremented in response to each completion report of a taken branch of a conditional branch instruction in the case where the conditional branch instruction is consecutively taken. Note that in the case of predicting the consecutively not-taken branch count, the completion count value CMPT-CNT is incremented in response to each completion report of a not-taken branch of a conditional branch instruction in the case where the conditional branch instruction is not taken consecutively. Although not illustrated, each entry in the LPT 125 has a use flag that is set, for example, in the case of counting the consecutively taken branch count and reset in the case of counting the consecutively not-taken branch count. Further, the LPT unit 123 predicts the consecutively taken branch count using entries having the use flag set, and predicts the consecutively not-taken branch count using entries having the use flag reset.

The loop count LP-NUM indicates a prediction value of the consecutively taken branch count, and is updated based on a completion report of the conditional branch instruction. For example, in the case where the loop count LP-NUM is "5", and the completion count value CMPT-CNT is from "1" to "4", the LPT control unit 124 predicts that the conditional branch instruction will be taken next time. In the case where the completion count value CMPT-CNT is "5", the LPT control unit 124 predicts that the conditional branch instruction will not be taken next time.

Note that in the case of predicting the consecutively not-taken branch count, the loop count LP-NUM of a valid entry indicates a prediction value of the consecutively not-taken branch count. For example, in the case where the loop count LP-NUM is "5", and the completion count value CMPT-CNT is from "1" to "4", the LPT control unit 124 predicts that the conditional branch instruction will not be taken next time. In the case where the completion count value CMPT-CNT is "5", the LPT control unit 124 predicts that the conditional branch instruction will be taken next time.

The current count value CURR-CNT is updated when a conditional branch instruction is fetched, when an instruction refetch request is generated, or when a repair request is generated. An example of a process of updating the current count value CURR-CNT will be described with reference to FIG. 8. The current count value CURR-CNT indicates a prediction value of the remaining taken branch count. Note that in the case of predicting the consecutively not-taken branch count, the current count value CURR-CNT indicates a prediction value of the remaining not-taken branch count.

In the case of receiving a completion report of a branch instruction from the RSBR 30 together with a program counter PC identifying a conditional branch instruction, the LPT unit 123 searches for an entry matching the program counter PC. For example, the LPT unit 123 compares the upper bits of the program counter PC with the tag TAG of each entry by using the lower bits of the program counter PC as the index.

In the case of detecting an entry that matches the program counter PC, the LPT control unit 124 executes update processing of the entry. In the case where there is no entry matching with the program counter PC, the LPT control unit 124 determines that there is no entry of the corresponding conditional branch instruction, and generates an entry. In the case where there is an entry in an invalid state or in the case where there is a replaceable entry, the LPT control unit 124 generates an entry based on the program counter PC included in the completion report. Note that the LPT control unit 124 may generate an entry by overwriting the information on the conditional branch instruction for which the completion report is received onto an entry having a value of the confidence CONF lower than the threshold value.

In the case where the entry is generated, the LPT control unit 124 overwrites the upper bits of the program counter PC of the conditional branch instruction to be generated onto the tag TAG of the generated entry, and sets the completion count value CMPT-CNT to "1".

In the case where there is an entry of the conditional branch instruction for which a completion report of a taken branch is received from the RSBR 30, the LPT control unit 124 increments the completion count value CMPT-CNT of the entry by "1". In the case where there is an entry of the conditional branch instruction for which a completion report of a not-taken branch is received from the RSBR 30, the LPT control unit 124 copies the completion count value CMPT-CNT of the entry to the loop count LP-NUM, and clears the completion count value CMPT-CNT to "0". Accordingly, the LPT unit 123 can predict the consecutively taken branch count by using the loop count LP-NUM.

Based on the completion report of a not-taken branch from the RSBR 30, the LPT control unit 124 compares the completion count value CMPT-CNT with the loop count LP-NUM. In the case where the count value CMPT-CNT is equal to the loop count LP-NUM, the LPT control unit 124 determines that a loop of the same pattern has repeatedly occurred, and increments the confidence CONF by "1". Further, the LPT unit 123 removes an entry whose confidence CONF is greater than or equal to a predetermined threshold value (e.g., "2") from among replacement targets, and uses the entry for branch prediction of the conditional branch instruction.

Note that in the case of predicting the consecutively not-taken branch count, and there is an entry of a conditional branch instruction for which a completion report of a not-taken branch is received from the RSBR 30, the LPT control unit 124 increments the completion count value CMPT-CNT of the entry by "1". In the case where there is an entry of a conditional branch instruction for which a completion report of a taken branch is received from the RSBR 30, the LPT control unit 124 copies the completion count value CMPT-CNT of the entry to the loop count LP-NUM, and clears the completion count value CMPT-CNT to "0".

Accordingly, LPT unit 123 can predict the consecutively not-taken branch count by using the loop count LP-NUM. In addition, upon a completion report of a taken branch from the RSBR 30, in the case where the count value CMPT-CNT is equal to the loop count LP-NUM, the LPT control unit 124 determines that a loop of the same pattern has repeatedly occurred, and increments the confidence CONF by "1".

For example, the bimodal prediction unit 122 has a 2-bit saturation counter for each index. In the case of receiving a completion report indicating a not-taken branch of a conditional branch instruction, the bimodal prediction unit 122 increments the saturation counter by "1", and in the case of receiving a completion report indicating a not-taken branch of the conditional branch instruction, decrements the saturation counter by "1". The bimodal prediction unit 122 uses the lower bits of the instruction fetch address received from the instruction fetch address generation unit 10 as the index, to select a saturation counter to be used for prediction.

Further, the bimodal prediction unit 122 predicts a taken branch in the case where the upper bit of the selected saturation counter is "1", and predicts a not-taken branch in the case where the upper bit of the selected saturation counter is "0". The bimodal prediction unit 122 outputs a prediction result (taken branch/not-taken branch) to the branch determination unit 127. Note that instead of the bimodal prediction unit 122, a piecewise prediction unit, a tagged geometric history length predictor (TAGE) prediction unit, or the like that has higher prediction accuracy than the bimodal prediction unit 122 may be provided.

The branch instruction information holding unit 126 includes multiple entries each holding a target address, a branch instruction flag, and a tag TAG, and holds information on a branch instruction completed in the past. The branch instruction information holding unit 126 is updated based on a completion report of the branch instruction from the RSBR 30, and searched based on an instruction fetch address from the instruction fetch address generation unit 10.

The target address indicates an instruction fetch address of a branch destination of the branch instruction. The branch instruction flag indicates whether the instruction is a conditional branch instruction or an unconditional branch instruction. The tag TAG indicates the upper bits of the program counter PC of the branch instruction.

In the case where there is no entry corresponding to the program counter included in a completion report indicating the taken branch of the conditional branch instruction, the branch instruction information holding unit 126 registers the conditional branch instruction for which the completion report is received in one of the entries. In addition, in the case where the target address held in the entry is incorrect or in the case where the branch instruction flag is incorrect, the branch instruction information holding unit 126 overwrites the entry with correct information.

The branch instruction information holding unit 126 searches for an entry based on an instruction fetch address from the instruction fetch address generation unit 10. In the case where there is an entry holding the lower bit of the instruction fetch address as the index and the upper bit of the instruction fetch address as the tag TAG, the branch instruction information holding unit 126 determines a hit. Further, the branch instruction information holding unit 126 outputs information "hit" indicating hit or miss and the branch instruction flag to the branch determination unit 127, and outputs the target address to the instruction fetch address generation unit 10.

The branch determination unit 127 outputs, to the instruction fetch address generation unit 10, a finally determined prediction result by the branch prediction mechanism 12 based on the prediction result from the LPT unit 123, the prediction result from the bimodal prediction unit 122, and the information from the branch instruction information holding unit 126. Information from the branch instruction information holding unit 126 includes hit and branch instruction flags. For example, in the case of receiving information hit and a branch instruction flag indicating a CNBR instruction from the branch instruction information holding unit 126, the branch determination unit 127 outputs a branch prediction result that indicates a taken branch of a conditional branch instruction, to the instruction fetch address generation unit 10.

In the case of receiving information hit and a branch instruction flag indicating a conditional branch instruction from the branch instruction information holding unit 126, the branch determination unit 127 first refers to the prediction result from the LPT unit 123. Then, in the case where the prediction result from the LPT unit 123 indicates a hit or a taken branch, the branch determination unit 127 outputs a branch prediction result that indicates a taken branch of the conditional branch instruction, to the instruction fetch address generation unit 10. In the case where the prediction result from the LPT unit 123 indicates a hit or a not-taken branch, the branch determination unit 127 outputs a branch prediction result that indicates a not-taken branch for the conditional branch instruction, to the instruction fetch address generation unit 10.

In the case of receiving the information hit and the branch instruction flag indicating the conditional branch instruction from the branch instruction information holding unit 126, and the prediction result from the LPT unit 123 is not a hit (miss), the branch determination unit 127 adopts the prediction result from the bimodal prediction unit 122. Then, the branch determination unit 127 outputs a branch prediction result that indicates a taken branch or a not-taken branch of a conditional branch instruction from the bimodal prediction unit 122, to the instruction fetch address generation unit 10.

In the case of not receiving the information hit from the branch instruction information holding unit 126 (miss), the branch determination unit 127 determines the not-taken branch of the branch instruction or the conditional branch instruction, and outputs the information on the branch not to be taken to the instruction fetch address generation unit 10. In the case of receiving information hit and a branch instruction flag indicating an unconditional branch instruction from the branch instruction information holding unit 126, the branch determination unit 127 outputs a branch prediction result that indicates a taken branch, to the instruction fetch address generation unit 10.

In the case of receiving a branch prediction result indicating the taken branch from the branch determination unit 127, the instruction fetch address generation unit 10 sets the target address received from the branch instruction information holding unit 126 as the next instruction fetch address. In the case of receiving the branch prediction result indicating the not-taken branch from the branch determination unit 127, the instruction fetch address generation unit 10 sets the address generated by updating the current program counter as the next instruction fetch address. The update amount of the program counter PC depends on the number of instructions fetched at once. For example, in the case of fetching four instructions at once, the instruction fetch address generation unit 10 advances the program counter by "4".

Figure 8:
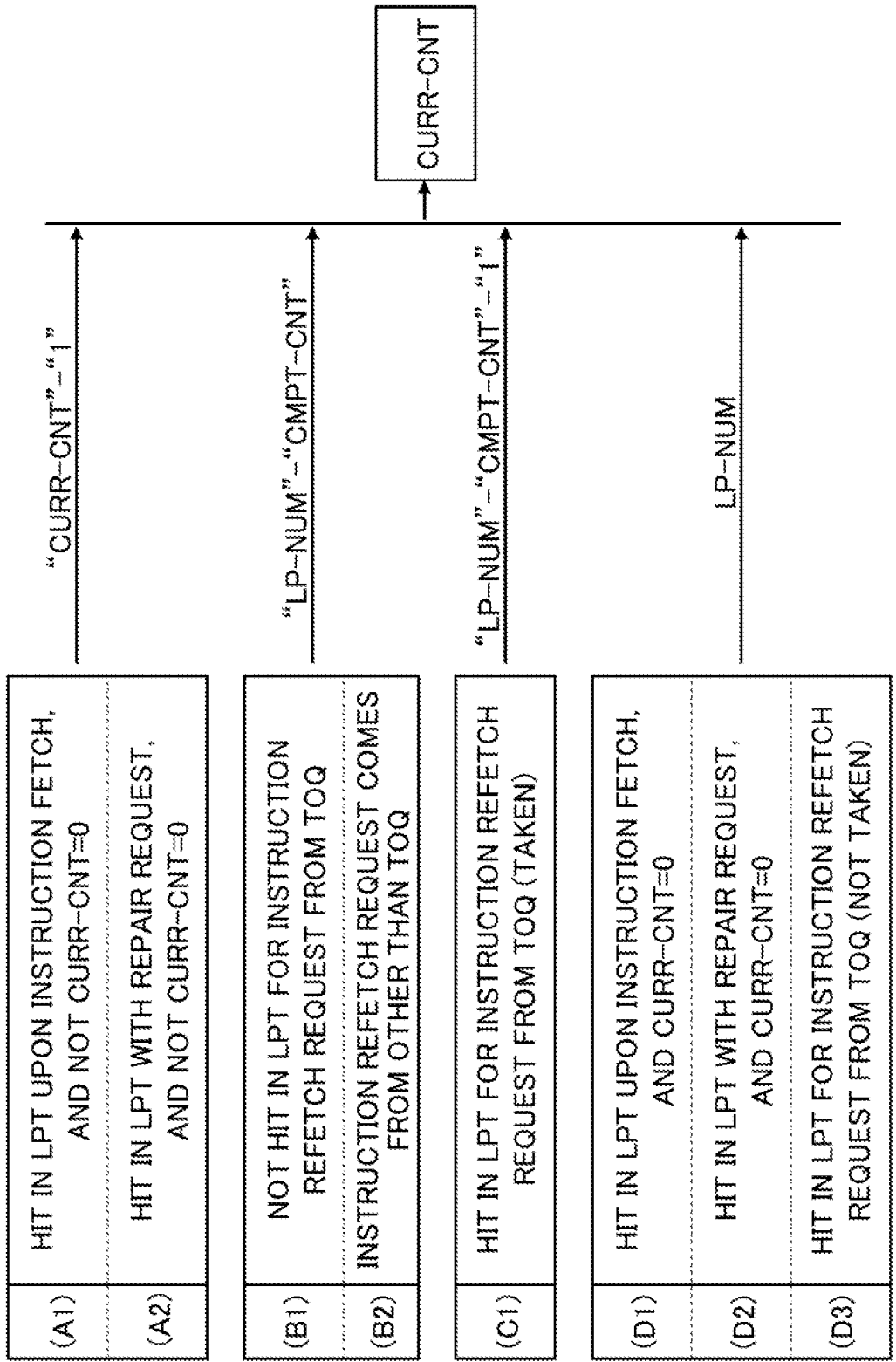
FIG. 8 is an explanatory diagram illustrating examples of update operations of a current count value of an LPT in FIG. 7.

FIG. 8 illustrates examples of update operations of the current count value CURR-CNT of the LPT 125 in FIG. 7. As described above, the current count value CURR-CNT is updated when a conditional branch instruction is fetched, when an instruction refetch request is generated, or when a repair request is generated.

In (A1), in the case where the instruction-fetched conditional branch instruction hits one of the entries in the LPT 125, and the current count value CURR-CNT is not "0", the LPT unit 123 decrements the current count value CURR-CNT by "1". For example, in the case where the loop count LP-NUM is 5, and the prediction of the taken branch of the conditional branch instruction is one of 1 to 4, the LPT unit 123 decrements the loop count LP-NUM. Accordingly, branch prediction by the LPT 125 can be continued.

In (A2), in the case where the conditional branch instruction corresponding to the program counter included in the repair request hits one of the entries in the LPT 125, and the current count value CURR-CNT is not "0", the LPT unit 123 decrements the current count value CURR-CNT by "1". In the case where the repair request hits the entry in the LPT 125, it indicates that a conditional branch instruction requiring decrement of the current count value CURR-CNT is present between the TOQ and the entry that outputs the instruction refetch request. Therefore, by decrementing the current count value CURR-CNT based on the determination of (A2), after the conditional branch instruction is refetched, a decrease in the prediction accuracy of the prediction value of the remaining taken branch count can be suppressed.

In (B1), in the case where the conditional branch instruction as the target of the instruction refetch request from the TOQ of the RSBR 30 does not hit any of the entries in the LPT 125, the LPT unit 123 updates the current count value CURR-CNT of the conditional branch instruction existing in the instruction loop of the target conditional branch instruction as follows. The LPT unit 123 sets a value obtained by subtracting the completion count value CMPT-CNT from the loop count LP-NUM to the current count value CURR-CNT.

In (B2), in the case where there is an instruction refetch request from an entry other than the TOQ of the RSBR 30, the LPT unit 123 sets a value obtained by subtracting the completion count value CMPT-CNT from the loop count LP-NUM to the current count value CURR-CNT. Accordingly, even in the case where an instruction refetch request is output out of order from an entry other than the TOQ, the current count value CURR-CNT can be updated as in the case where the instruction refetch request is output from the TOQ.

In (C1), in the case where an instruction refetch request indicating a taken branch from the RSBR 30 hits one of the entries in the LPT 125, the LPT unit 123 sets a value obtained by subtracting the completion count value CMPT-CNT from the loop count LP-NUM to the current count value CURR-CNT. Further, the LPT unit 123 decrements the current count value CURR-CNT by "1".

For example, in the determination of (C1), in the case where the loop count LP-NUM is 5 and the completion count value CMPT-CNT is 0, the LPT unit 123 predicts a not-taken branch to exit from the instruction loop. However, if it is actually a taken branch and the prediction failed, the LPT unit 123 determines that the first time branch is taken in the instruction loop of the conditional branch instruction to be repeated five times. In this case, as the prediction value of the remaining taken branch count is 4, the current count value CURR-CNT is set to "4", which is "loop count LP-NUM"−"completion count value CMPT-CNT"−"1". Accordingly, similar to normal operations using the LPT 125 to predict the remaining taken branch count, the LPT unit 123 can set the current count value CURR-CNT to a prediction value after the first occurrence of taken branch of the conditional branch instruction.

In addition, in the determination of (C1), for a conditional branch instruction held in an entry having a confidence CONF lower than the threshold in the LPT 125, branch prediction is executed by the bimodal prediction unit 122 instead of the LPT unit 123. In this state, assume that a taken branch of the conditional branch instruction is predicted based on the information held in the LPT 125, the bimodal prediction unit 122 predicts a not-taken branch, and the prediction of the bimodal prediction unit 122 failed. At this time, the RSBR 30 outputs an instruction refetch request (taken branch) according to the program counter PC when the branch is taken.

For example, in the case where the loop count LP-NUM is 5 and the completion count value CMPT-CNT is 3, the remaining branch count (taken branch) on the completion basis is 2 regardless of the current count value CURR-CNT. In the case where the instruction refetch request (taken branch) of (C1) is output in this state, the LPT unit 123 sets "1", which is "loop count LP-NUM"–"completion count value CMPT-CNT"–"1", to the current count value CURR-CNT. Accordingly, similar to normal operations using the LPT 125 to predict the remaining taken branch count, the LPT unit 123 can set the current count value CURR-CNT to a prediction value after the conditional branch instruction is taken three consecutive times.

In (D1), in the case where the instruction-fetched conditional branch instruction hits one of the entries in the LPT 125, and the current count value CURR-CNT is "0", the LPT unit 123 sets the loop count LP-NUM to the current count value CURR-CNT. For example, in the determination of (D1), in the case where the loop count LP-NUM is 5, the prediction of the taken branch of the conditional branch instruction results in hits five times consecutively, and the current count value CURR-CNT becomes "0", the LPT unit 123 returns the loop count LP-NUM to 5. Accordingly, branch prediction by the LPT 125 can be continued.

In (D2), in the case where the conditional branch instruction corresponding to the program counter included in the repair request hits one of the entries in the LPT 125, and the current count value CURR-CNT is "0", the LPT unit 123 sets the loop count LP-NUM to the current count value CURR-CNT. In the determination of (D2), similar to (A2) described above, in the case where the repair request hits the entry in the LPT 125, it indicates that a conditional branch instruction requiring decrement of the current count value CURR-CNT is present between the TOQ and the entry that outputs the instruction refetch request. Therefore, by setting the loop count LP-NUM to the current count value CURR-CNT based on the determination of (D2), after the conditional branch instruction is refetched, a decrease in the prediction accuracy of the prediction value of the remaining taken branch count can be suppressed.

In (D3), in the case where the instruction refetch request indicating the not-taken branch from the RSBR 30 hits one of the entries in the LPT 125, the LPT unit 123 sets the loop count LP-NUM to the current count value CURR-CNT.

For example, in the determination of (D3), in the case where the loop count LP-NUM is 5 and the completion count value CMPT-CNT is 3, the remaining branch count (taken branch) on the completion basis is 2 regardless of the current count value CURR-CNT. In the case where the branch prediction failed when the taken branch of the conditional branch instruction is predicted in this state (actually, a not-taken branch), the LPT unit 123 determines that the instruction loop is newly started, and returns the loop count LP-NUM to 5. Accordingly, branch prediction by the LPT 125 can be resumed.

In addition, in the determination of (D3), assume that the bimodal prediction unit 122 predicts a taken branch in the case where the LPT unit 123 collects information on a taken branch or not-taken branch for an entry having a low confidence CONF. Further, assume that the prediction of the bimodal prediction unit 122 fails and an instruction refetch request is output. For example, in the case where the loop count LP-NUM is 5 and the completion count value CMPT-CNT is 0, the remaining branch count (taken branch) on the completion basis is 5 regardless of the current count value CURR-CNT. Therefore, the LPT unit 123 determines that the instruction loop is newly started, and returns the loop count LP-NUM to 5. This is the same as the operations of branch prediction in (D1) using the entry in the LPT 125.

Figure 9:
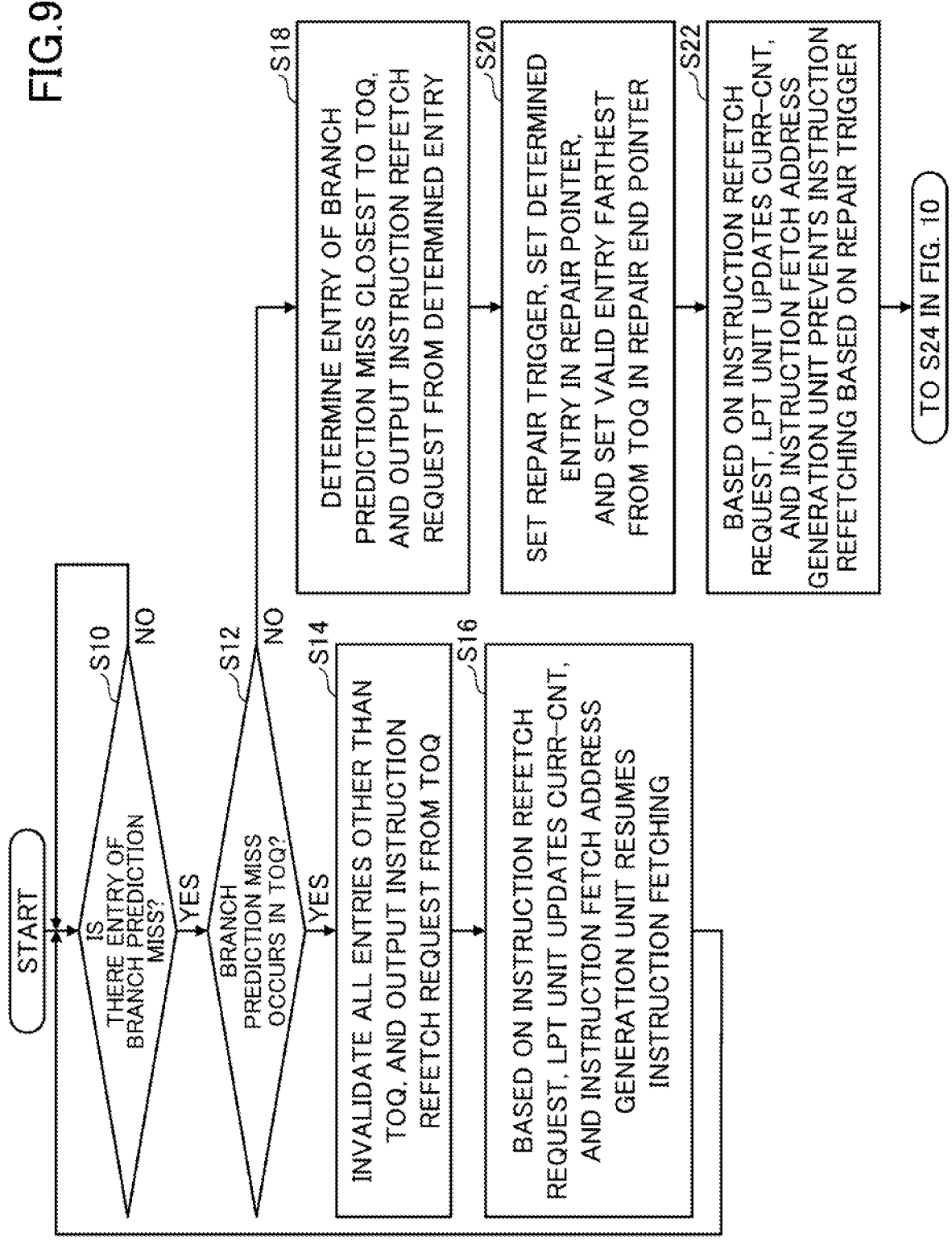
FIG. 9 is a flow chart illustrating an example of operations of an RSBR, an LPT unit, and an instruction fetch address generation unit in FIG. 7.
Figure 10:
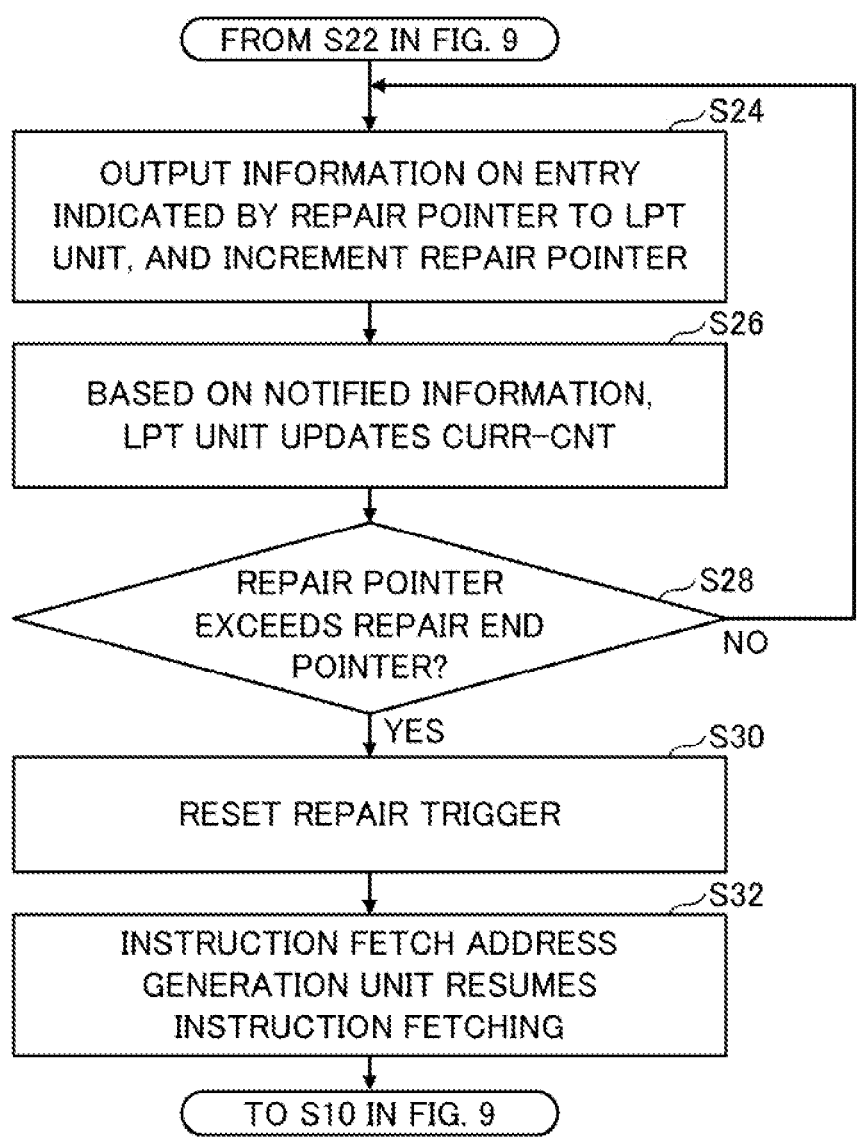
FIG. 10 is a flow chart illustrating a continuation of FIG. 9.

FIGS. 9 and 10 illustrate an example of operations of the RSBR 30, the LPT unit 123, and the instruction fetch address generation unit 10 in FIG. 7. In other words, FIGS. 9 and 10 illustrate an example of an arithmetic processing method of the arithmetic processing device 102. Operations illustrated in FIGS. 9 and 10 are executed repeatedly.

Note that the RSBR 30, the LPT unit 123, and the instruction fetch address generation unit 10 correspond to the branch instruction issuance scheduler 3, the branch prediction unit 5, and the address generation unit 1 illustrated in FIG. 1. In addition, the completion count value CMPT-CNT, the loop count LP-NUM, and the current count value CURR-CNT correspond to the current taken branch count, the prediction value of the consecutively taken branch count, and the prediction value of the remaining taken branch count described in the embodiment described with reference to FIGS. 1 to 4, respectively.

Therefore, the operations described with reference to FIGS. 1 to 4 can also be applied to the operations of the arithmetic processing device 102 in FIG. 5. For example, the description of the instruction refetch request output by the branch instruction issuance scheduler 3 in FIG. 3 can also be applied to the description of the RSBR 30. The operations of the branch instruction issuance scheduler when an instruction loop is processed in FIG. 4 can also be applied to the operation of RSBR The RSBR 30 determines whether a branch prediction miss of a conditional branch instruction held in each of all entries of the branch instruction completion queue 301 has occurred. The RSBR 30 sets the prediction result flag of the entry in which an occurrence of the branch prediction miss is determined to "1" indicating the occurrence of the branch prediction miss. The RSBR 30 continues normal completion processing of the branch instruction if a branch prediction miss has not been determined.

First, at Step S10, the RSBR 30 repeatedly determines whether there is an entry (having the prediction result flag in a set state) in which a branch prediction miss occurs in the branch instruction completion queue 301. The RSBR 30 executes Step S12 in the case where there is an entry in which a branch prediction miss occurs. At Step S12, the RSBR 30 executes Step S14 in the case where the branch prediction miss occurs in the TOQ, or executes Step S18 in the case where the branch prediction miss occurs in an entry other than the TOQ.

At Step S14, the RSBR 30 invalidates information held in all entries other than the TOQ, and outputs an instruction refetch request for the conditional branch instruction held in the TOQ. Next, at Step S16, based on the instruction refetch request output from the RSBR 30, the LPT unit 123 updates the current count value CURR-CNT of the LPT according to the algorithm illustrated in FIG. 8. The instruction fetch address generation unit 10 resumes instruction fetching based on the instruction refetch request output from the RSBR 30. After the operation at Step S16, Step S10 is executed.

At Step S18, the RSBR 30 searches for entries in the branch instruction completion queue 301 in which the prediction result flag is set, and determines an entry closest to the TOQ in which the branch prediction miss occurs. The RSBR 30 invalidates information held in entries after the determined entry, and outputs an instruction refetch request of the conditional branch instruction held in the determined entry.

Next, at Step S20, the RSBR 30 sets a repair trigger to prevent refetching of the conditional branch instruction by the instruction fetch address generation unit 10. In addition, the RSBR 30 sets the identification number of the entry determined at Step S18 in the repair end pointer 304, and sets the value of the output pointer OUTP in the repair pointer 303. The repair end pointer 304 and the repair pointer 303 are used in operations illustrated in FIG. 10.

Next, at Step S22, based on the instruction refetch request output from the RSBR 30, the LPT unit 123 updates the current count value CURR-CNT of the LPT according to the algorithm illustrated in FIG. 8. In this case, as this corresponds to "INSTRUCTION REFETCH REQUEST COMES FROM OTHER THAN TOQ" in FIG. 8, the LPT unit 123 sets a value obtained by subtracting the completion count value CMPT-CNT from the loop count LP-NUM to the current count value CURR-CNT. The instruction fetch address generation unit 10 receives the instruction refetch request, but does not restart instruction fetching because the repair trigger is set, and waits for resetting of the repair trigger.

Next, at Step S24 in FIG. 10, the RSBR 30 outputs the conditional branch instruction flag and the program counter PC held in the entry indicated by the repair pointer to the LPT unit 123, and increments the repair pointer 303.

Next, at Step S26, based on the instruction refetch request LPT unit output from the RSBR 30, the LPT unit 123 updates the current count value CURR-CNT of the LPT according to the algorithm illustrated in FIG. 8.

Next, at Step S28, in the case where the repair pointer 303 exceeds the repair end pointer 304, the RSBR 30 determines that the update of the current count value CURR-CNT corresponding to the entry to be repaired is completed, and executes Step S30. On the other hand, in the case where the repair pointer 303 does not exceed the repair end pointer 304, the RSBR 30 returns the processing to Step S24 to continue the update of the current count value CURR-CNT corresponding to the entry to be repaired.

At Step S30, as the update processing of the current count value CURR-CNT corresponding to the entry to be repaired is completed, the RSBR 30 resets the repair trigger. Next, at Step S32, the instruction fetch address generation unit 10 resumes instruction fetching corresponding to the instruction refetch request based on the reset of the repair trigger. Thereafter, the processing returns to Step S10 in FIG. 9.

As above, also in this embodiment, the same effects as in the embodiment described above can be obtained. For example, even in the case where the instruction refetch request is output out of order from an entry other than the TOQ, the current count value CURR-CNT as the prediction value of the remaining taken branch count of the uncompleted conditional branch instruction can be updated to an appropriate value. Therefore, a decrease can be suppressed in the prediction accuracy of the prediction value of the remaining taken branch count of the conditional branch instruction in the instruction loop. As a result, the processing efficiency of the pipeline can be improved, and the processing performance of the arithmetic processing device 102 can be improved.

Further, in the present embodiment, by preventing instruction refetching during the course of setting the repair trigger, the refetch of the conditional branch instruction can be prevented from starting before completion of the repair process, the entry in the LPT 125 can be prevented from being updated, and the LPT 125 can be prevented from malfunctioning.

Figure 11:
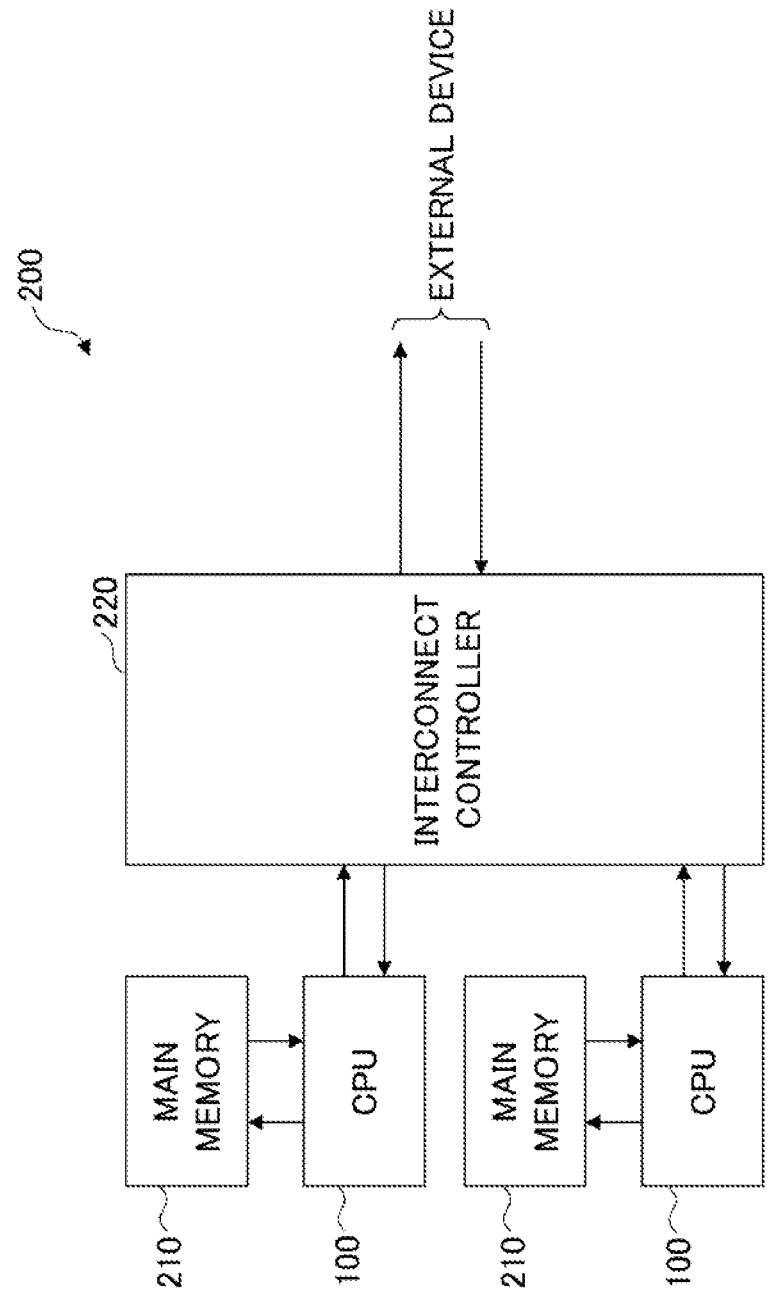
FIG. 11 is a block diagram illustrating an example of an information processing system including the arithmetic processing device in FIG. 1 or the arithmetic processing device in FIG. 5.

FIG. 11 illustrates an example of an information processing system including the arithmetic processing device 100 in FIG. 1 or the arithmetic processing device 102 in FIG. 5. In FIG. 11, an example in which the arithmetic processing device 100 is installed in an information processing system is illustrated.

For example, the information processing system illustrated in FIG. 11 is a server 200. The server 200 includes multiple arithmetic processing devices 100, multiple main memories 210, and an interconnect controller 220. For example, the arithmetic processing device 100 is a processor such as a central processing unit (CPU), and is connected to the interconnect controller 220. Each main memory 210 is connected to a corresponding one of the arithmetic processing devices 100. The interconnect controller 220 is connected to an external device such as a hard disk device or a communication device, and executes input/output control on the external device.

The features and advantages of the embodiments will be apparent from the detailed description above. This is intended to cover the features and advantages of the embodiments as described above without departing from the spirit and scope of the claims. In addition, any modification and variation would be readily conceivable by those skilled in the art. Therefore, it is not intended to limit the scope of the inventive embodiments to those described above, and it is also possible to rely on suitable modifications and equivalents included in the scope disclosed in the embodiments.

It should be noted that the branch prediction unit 5 is an example of a branch predictor;
the prediction holding unit 6 is an example of a prediction holder;
the address generation unit 1 or 10 is an example of an address generator;
the branch instruction issuance scheduler 3 is an example of a branch instruction issuance scheduler; and
the branch instruction completion queue 4 is an example of a branch instruction completion queue.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An arithmetic processing device that executes instructions by pipeline processing, comprising:
    a branch predictor including a prediction holder configured to hold prediction information including a prediction value of a consecutively taken branch count for each conditional branch instruction, a current taken branch count for said each conditional branch instruction, and a prediction value of a remaining taken branch count for said each conditional branch instruction, and configured to predict the consecutively taken branch count for said each conditional branch instruction based on the prediction values;
    an address generator configured to generate a fetch address of a next instruction, based on a prediction result by the branch predictor or an address included in an instruction refetch request; and
    a branch instruction issuance scheduler including a branch instruction completion queue sequentially holding branch instructions each fetched based on the fetch address, and configured to complete the branch instructions held in the branch instruction completion queue in order, output the instruction refetch request in a case where a branch prediction miss is determined by the branch predictor based on an execution result of a conditional branch instruction, and in a case where a branch prediction miss is determined for a conditional branch instruction held at an entry other than a head of the branch instruction completion queue, output a repair request to the branch predictor corresponding to conditional branch instructions held between the entry where the branch prediction miss is determined and the head of the branch instruction completion queue, wherein the branch predictor sets the prediction value of the remaining taken branch count to a difference between the prediction value of the consecutively taken branch count and the current taken branch count, based on the instruction refetch request from the entry other than the head of the branch instruction completion queue, and further subtracts a number of conditional branch instructions corresponding to the repair request from the prediction value of the remaining taken branch count.

2. The arithmetic processing device as claimed in claim 1, wherein, in a case where a plurality of conditional branch instructions for each of which a branch prediction miss is determined are present in the branch instruction completion queue, the branch instruction issuance scheduler outputs the instruction refetch request for a conditional branch instruction closest to the head of the branch instruction completion queue for which a branch prediction miss is determined, and invalidates branch instructions held after the conditional branch instruction for which the branch prediction miss is determined in the branch instruction completion queue.

3. The arithmetic processing device as claimed in claim 1, wherein after outputting the repair request to the branch predictor, the branch instruction issuance scheduler prevents generation of the fetch address by the address generator while the prediction value of the remaining taken branch count is being updated based on the repair request.

4. The arithmetic processing device as claimed in claim 1, wherein the prediction holder further predicts a consecutively not-taken branch count of said each conditional branch instruction by holding a prediction value of the consecutively not-taken branch count of said each conditional branch instruction, a current not-taken branch count of said each conditional branch instruction, and a prediction value of a remaining not-taken branch count of said each conditional branch instruction; and wherein the branch predictor sets the prediction value of the remaining not-taken branch count to a difference between the prediction value of the consecutively not-taken branch count and the current not-taken branch count, based on the instruction refetch request from an entry other than the head of the branch instruction completion queue, and further subtracts a number of conditional branch instructions corresponding to the repair request from the prediction value of the remaining not-taken branch count.

5. The arithmetic processing device as claimed in claim 1, wherein the branch predictor reduces the prediction value of the remaining taken branch count in a case where the prediction value of the remaining taken branch count is not "0" upon receiving the repair request, and sets the prediction value of the consecutively taken branch count to the prediction value of the remaining taken branch count in a case where the prediction value of the remaining taken branch count is "0" upon receiving the repair request.

6. The arithmetic processing device as claimed in claim 1, wherein the branch predictor decrements the prediction value of the remaining taken branch count in a case where the prediction value of the remaining taken branch count is not "0" when an instruction is fetched at the fetch address generated by the address generator, and sets the prediction value of the consecutively taken branch count to the prediction value of the remaining taken branch count in a case where the prediction value of the remaining taken branch count is "0" when the instruction is fetched at the fetch address generated by the address generator.

7. The arithmetic processing device as claimed in claim 1, wherein in a case where the branch predictor does not hold prediction information of a conditional branch instruction corresponding to the instruction refetch request output corresponding to the conditional branch instruction held at the head of the branch instruction completion queue, the branch predictor sets a value obtained by subtracting the current taken branch count from the prediction value of the consecutively taken branch count to the prediction value of the remaining taken branch count.

8. The arithmetic processing device as claimed in claim 1, wherein in a case where the instruction refetch request due to a branch prediction miss of a not-taken branch is output to the conditional branch instruction held at the head of the branch instruction completion queue, and the prediction holder holds prediction information on the output conditional branch instruction, the branch predictor sets a value obtained by further subtracting "1" from a value obtained by subtracting the current taken branch count from the prediction value of the consecutively taken branch count to the prediction value of the remaining taken branch count.

9. An arithmetic processing method executed by an arithmetic processing device having a branch predictor, an address generator, and a branch instruction issuance scheduler to execute instructions by pipeline processing, the arithmetic processing method comprising:

predicting, executed by the branch predictor including a prediction holder configured to hold prediction information including a prediction value of a consecutively taken branch count for each conditional branch instruction; a current taken branch count for said each conditional branch instruction; and a prediction value of a remaining taken branch count for said each conditional branch instruction, the consecutively taken branch count for said each conditional branch instruction based on the prediction values;

generating, executed by the address generator, a fetch address of a next instruction, based on a prediction result by the branch predictor or an address included in an instruction refetch request; and completing, executed by the branch instruction issuance scheduler including a branch instruction completion queue sequentially holding branch instructions each fetched based on the fetch address, the branch instructions held in the branch instruction completion queue in order, outputting the instruction refetch request in a case where a branch prediction miss is determined by the branch predictor based on an execution result of a conditional branch instruction, and in a case where a branch prediction miss is determined for a conditional branch instruction held at an entry other than a head of the branch instruction completion queue, outputting a repair request to the branch predictor corresponding to conditional branch instructions held between the entry where the branch prediction miss is determined and the head of the branch instruction completion queue, wherein the branch predictor sets the prediction value of the remaining taken branch count to a difference between the prediction value of the consecutively taken branch count and the current taken branch count, based on the instruction refetch request from the entry other than the head of the branch instruction completion queue, and further subtracts a number of conditional branch instructions corresponding to the repair request from the prediction value of the remaining taken branch count.

* * * * *